(12) United States Patent
Kim et al.

(10) Patent No.: US 12,362,386 B2
(45) Date of Patent: Jul. 15, 2025

(54) SOLID ELECTROLYTE, PREPARATION METHOD THEREOF, LITHIUM AIR BATTERY INCLUDING THE SOLID ELECTROLYTE, AND ELECTROCHEMICAL DEVICE INCLUDING THE SOLID ELECTROLYTE

(71) Applicant: Samsung Electronics Co., Ltd., Suwon-si (KR)

(72) Inventors: Mokwon Kim, Suwon-si (KR); Hyunpyo Lee, Seoul (KR); Sangbok Ma, Suwon-si (KR); Jungock Park, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 536 days.

(21) Appl. No.: 17/877,605

(22) Filed: Jul. 29, 2022

(65) Prior Publication Data
US 2023/0198005 A1  Jun. 22, 2023

(30) Foreign Application Priority Data
Dec. 17, 2021 (KR) .......................... 10-2021-0182212

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
CPC ......... H01M 10/0562; H01M 10/0525; H01M 2300/008

USPC ........................................................... 429/323
See application file for complete search history.

(56) References Cited

U.S. PATENT DOCUMENTS

| | | | |
|---|---|---|---|
| 2006/0078790 A1* | 4/2006 | Nimon | H01M 4/664 429/246 |
| 2014/0170465 A1* | 6/2014 | Visco | H01M 50/449 429/144 |
| 2017/0250440 A1 | 8/2017 | Nemori et al. | |
| 2017/0294671 A1 | 10/2017 | Jin et al. | |
| 2020/0227802 A1 | 7/2020 | Kim et al. | |
| 2021/0167419 A1 | 6/2021 | Ma et al. | |
| 2021/0184221 A1 | 6/2021 | Choi et al. | |
| 2021/0296687 A1 | 9/2021 | Lee et al. | |

FOREIGN PATENT DOCUMENTS

| | | |
|---|---|---|
| JP | 201991703 A | 6/2019 |
| KR | 1020160025287 A | 3/2016 |
| KR | 1020170123727 A | 11/2017 |
| KR | 1020200057128 A | 5/2020 |

(Continued)

*Primary Examiner* — James M Erwin
(74) *Attorney, Agent, or Firm* — CANTOR COLBURN LLP

(57) ABSTRACT

A solid electrolyte includes: a first electrolyte layer including an inorganic lithium ion conductor; and a second electrolyte layer disposed on at least one side of the first electrolyte layer and including a compound represented by Formula 1

$$Li_{1-3x+4y}(Hf_a M_{1-a})_{2-y}(PO_{4-x}Q_x)_3 \quad \text{Formula 1}$$

wherein in Formula 1, M is at least one of a monovalent to a hexavalent element, wherein $0 < a \leq 1$, $0 \leq x < 1/3$, and $0 \leq y < 2$, and Q is F, Cl, Br, I, a pseudohalogen, or a combination thereof.

30 Claims, 8 Drawing Sheets

(56) References Cited

FOREIGN PATENT DOCUMENTS

| KR | 1020210014364 A | 2/2021 |
| KR | 1020210068965 A | 6/2021 |
| KR | 1020210075728 A | 6/2021 |
| KR | 1020210117968 A | 9/2021 |

* cited by examiner

SOLID ELECTROLYTE, PREPARATION METHOD THEREOF, LITHIUM AIR BATTERY INCLUDING THE SOLID ELECTROLYTE, AND ELECTROCHEMICAL DEVICE INCLUDING THE SOLID ELECTROLYTE

CROSS-REFERENCE TO RELATED APPLICATION

This application is based on and claims priority to Korean Patent Application No. 10-2021-0182212, filed on Dec. 17, 2021 in the Korean Intellectual Property Office, and all the benefits accruing therefrom under 35 U.S.C. § 119, the content of which is incorporated by reference herein in its entirety.

BACKGROUND

1. Field

Provided are a solid electrolyte, a method of preparing the same, a lithium air battery including the same, and an electrochemical device including the same.

2. Description of the Related Art

A lithium air battery utilizes lithium metal as an anode, and does not store air, which is a cathode active material, inside the battery, and thus can be manufactured as a high-capacity battery. A lithium air battery has an extremely high theoretical specific energy of 3,500 watt hours per kilogram (Wh/kg).

A lithium air battery comprises a lithium anode, a barrier allowing lithium ions to pass therethrough while protecting the lithium anode from oxygen or moisture, and a cathode support, and stores energy using oxidation and reduction reactions of oxygen introduced from outside air. Electrolytes in the cathode include an organic liquid electrolyte, an aqueous liquid electrolyte, or a solid electrolyte. However, since in most cases, moisture introduced from the outside cannot be completely blocked, there may be a small amount of moisture at the cathode, which leads to formation of lithium hydroxide (LiOH) when discharging, and the area around the cathode may turn alkaline. Therefore, there remains a need for materials to provide improved stability.

SUMMARY

An aspect provides a solid electrolyte that is stable when contacted with moisture or an alkaline compound.

Another aspect provides a lithium air battery including the solid electrolyte.

Another aspect provides an electrochemical device including the above-described solid electrolyte.

Another aspect provides a method of preparing the solid electrolyte.

Additional aspects will be set forth in part in the description which follows and, in part, will be apparent from the description, or may be learned by practice of the presented embodiments of the disclosure.

According to an aspect, provided is a solid electrolyte including: a first electrolyte layer including an inorganic lithium ion conductor; and a second electrolyte layer disposed on at least one side of the first electrolyte layer and including a compound represented by Formula 1

$$Li_{1-3x+4y}(Hf_aM_{1-a})_{2-y}(PO_{4-x}Q_x)_3 \quad \text{Formula 1}$$

wherein, in Formula 1, M is at least one of a monovalent to a hexavalent element, wherein $0<a\leq 1$, $0\leq x<\frac{1}{3}$, and $0\leq y<2$, and Q is F, Cl, Br, I, a pseudohalogen, or a combination thereof.

According to another aspect, provided is a lithium air battery including: a cathode; an anode; and an electrolyte disposed between the cathode and the anode, wherein the electrolyte includes a solid electrolyte comprising a first electrolyte layer comprising an inorganic lithium ion conductor, and a second electrolyte layer disposed on at least one side of the first electrolyte layer and comprising a compound represented by Formula 1

$$Li_{1-3x+4y}(Hf_aM_{1-a})_{2-y}(PO_{4-x}Q_x)_3 \quad \text{Formula 1}$$

wherein, in Formula 1, M is at least one of a monovalent to a hexavalent element, wherein $0<a\leq 1$, $0\leq x<\frac{1}{3}$, and $0\leq y<2$, and Q is F, Cl, Br, I, a pseudohalogen, or a combination thereof.

According to another aspect, an electrochemical device including the solid electrolyte is provided.

The electrochemical device includes a battery, an accumulator, a supercapacitor, a fuel cell, a sensor, or an electrochromic device.

According to another aspect, provided is a method of preparing a solid electrolyte, the method including: providing a first electrolyte layer including an inorganic lithium ion conductor; and disposing a second electrolyte layer including a compound represented by Formula 1 on at least one side of the first electrolyte layer, to prepare the solid electrolyte $$Li_{1-3x+4y}(Hf_aM_{1-a})_{2-y}(PO_{4-x}Q_x)_3 \quad \text{Formula 1}$$

wherein, in Formula 1, M is at least one of a monovalent to a hexavalent element, wherein $0<a\leq 1$, $0\leq x<\frac{1}{3}$, and $0\leq y<2$, and Q is F, Cl, Br, I, a pseudohalogen, or a combination thereof.

The disposing of the second electrolyte layer includes coating a mixture including a vehicle and a compound for forming the compound represented by Formula 1, and heat-treating the mixture to remove the vehicle and form the compound represented by Formula 1. The heat-treating comprises heat-treating at a temperature of about 800° C. to about 1,200° C.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
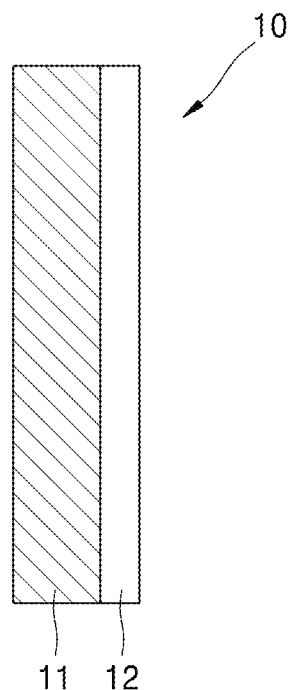
FIG. 1A schematically shows an example of a structure of a solid electrolyte.

Reference will now be made in detail to embodiments, examples of which are illustrated in the accompanying drawings, wherein like reference numerals refer to like elements throughout the specification. In this regard, the present embodiments may have different forms and should not be construed as being limited to the descriptions set forth herein. Accordingly, the embodiments are merely described below, by referring to the figures, to explain various aspects. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list.

The present inventive concept described below may have various modifications and various embodiments, and will be described in greater details in conjunction with specific embodiments illustrated in the drawings. The present inventive concept may, however, should not be construed as limited to the example embodiments set forth herein, and rather, should be understood as covering all modifications, equivalents, or alternatives falling within the scope of the present inventive concept.

The terms used herein is for the purpose of describing particular embodiments only, and is not intended to be limiting the present inventive concept. As used herein, the singular are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. As used herein, "/" may be interpreted as "and", or as "or" depending on the context.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

In the drawings, thicknesses may be magnified or exaggerated to clearly illustrate various layers and regions. Like reference numbers may refer to like elements throughout the drawings and the following description. It will be understood that when one element, layer, film, section, sheet, etc. is referred to as being "on" or "above" another element, it can be directly on the other element or intervening elements may be present therebetween. It will be understood that, although the terms "first," "second," "third," etc. may be used herein to describe various elements, these elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terms used herein are only to describe a particular embodiment and should not be construed as limiting the present inventive concept. The term "or" means "and/or". As used in the present specification, the term "and/or" means including one or more components on a list of one or more associated components.

Unless otherwise defined, all terms used in the present application (including technical and scientific terms) have the same meaning as generally understood by those of ordinary skill in the art in the technical field to which the present disclosure belongs. Further, the terminology as defined in the commonly used dictionary shall be interpreted as having the meaning appropriate to the context in the related technology and the present disclosure, and shall not be interpreted as having an idealized meaning. Or the terminology shall not be interpreted as having too formal a meaning.

Example embodiments will be described in conjunction with the cross-sectional views that are schematic views of idealized embodiments. As such, modifications from the illustrated forms, as a result of manufacturing technique and/or acceptable errors, etc. shall be expected. Therefore, the embodiments described in the present specification shall not be understood as being limited to particular forms of the regions illustrated herein, but shall be understood as including variations in form resulting from manufacturing, for example. For example, regions illustrated or described as being flat may have a typical roughness and/or a non-linear feature. Further, an angle illustrated as sharp may be rendered round. Accordingly, the regions illustrated in the drawings are essentially schematic and are not provided to illustrate the accurate form of the corresponding form, and shall not be construed as limiting the scope of the claims.

Hereinbelow, a solid electrolyte, a method of preparing the same, and a lithium air battery and an electrochemical device including the same according to examples will be described in greater details.

A lithium air battery uses an oxygen barrier electrolyte layer to protect a lithium anode from moisture and oxygen from the outside. A solid electrolyte can be used as an electrolyte layer of a lithium air battery to provide reversibility in humid or atmospheric conditions, and to this end, stability with respect to moisture and lithium hydroxide (LiOH), which is a discharge product, is desired. However, in available solid electrolytes, as the cathode turns alkaline upon discharging the lithium air battery, metal ions inside the solid electrolyte are dissolved by the cathode, and due to the dissolution of metal ions, ionic conductivity may decrease and cracks may be formed. Thus, alkaline conditions in the cathode of a lithium air battery may degrade a solid electrolyte used as a barrier. Therefore, and while not wanting to bound by theory, a solid electrolyte of a lithium air battery may have unsatisfactory stability with respect to lithium hydroxide, which is a discharge product of the lithium air battery, and have decreased ion conductivity or suffer cracks in strong alkaline conditions such as in the presence of lithium hydroxide.

In this context, to address the aforementioned issues, disclosed is a solid electrolyte having improved stability in alkaline conditions, by providing a solid electrolyte having a bilayer structure in which a first electrolyte layer including a lithium ion conductor is coated with a second electrolyte layer comprising a compound that is stable in contact with moisture or a strong base, such as lithium hydroxide. The second electrolyte layer may function to protect the first electrolyte layer from alkaline conditions when charging/discharging a cell.

The solid electrolyte according to an example includes: a first electrolyte layer including an inorganic lithium ion conductor; and a second electrolyte layer disposed on at least one side of the first electrolyte layer and including a compound represented by Formula 1.

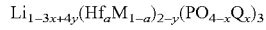

Formula 1

In Formula 1, M is at least one of a monovalent to a hexavalent element, wherein $0<a\leq 1$, $0\leq x<\frac{1}{3}$, and $0\leq y<2$, and Q is F, Cl, Br, I, a pseudohalogen, or a combination thereof.

The term "pseudohalogen" in the present specification refers to a molecule comprising two or more electronegative atoms similar to halogens in a free state, and generates anions similar to halide ions. Examples of the pseudohalogen include cyanides, cyanates, thiocyanates, azides, or a combination thereof.

Q may be, for example, one or more halogen atoms, for example, two halogen atoms, and may substitute a portion of oxygen sites in Formula 1.

Here, Q may be chlorine (Cl), bromine (Br), fluorine (F), a cyanide, a cyanate, a thiocyanate, an azide, or a combination thereof. In an aspect, Q is F, Cl, Br, or I.

Figure 1B:
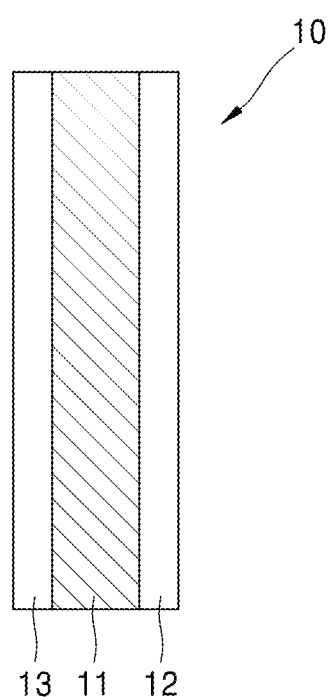
FIG. 1B schematically shows an example of a structure of a solid electrolyte.

FIG. 1 shows a schematic structure of a solid electrolyte according to an example.

A solid electrolyte 10 may have a structure including a first electrolyte layer 11 comprising an inorganic lithium ion conductor, and a second electrolyte layer 12 comprising a compound represented by Formula 1, disposed thereon. The second electrolyte layer 12 includes a compound represented by Formula 1 and thus may act as a protection layer stable to moisture and strong bases, with respect to the first electrolyte layer 11 comprising an inorganic lithium ion conductor.

Using the second electrolyte layer, which comprises the compound of Formula 1, provides electrolyte surfaces without micropores, or defects, and minimizes changes to interfacial morphology between the electrolyte and electrodes, thus maintaining stable phosphate-based compounds. It is understood that the improved stability results from the stability of the compound of Formula 1 to alkaline conditions (e.g., due to the formation of lithium hydroxide, which is a discharge product formed while discharging a lithium air battery), and/or to moisture. Thus, a solid electrolyte capable of retaining excellent ionic conductivity may be provided. Such a solid electrolyte may be used to suppress initial charge-discharge side reactions in a cell, and prepare an electrochemical device having excellent lifetime characteristics. The electrochemical device may be, for example, a lithium air battery.

The solid electrolyte according to an example may comprise a phase which is isostructural with a sodium superionic-conductor compound, e.g., NASICON or having a NASICON-like crystal structure. Such characteristics may be confirmed via an X-ray Diffraction (XRD) analysis.

The solid electrolyte may have a second electrolyte layer including one or more compounds represented by Formula 1 on at least one side of a first electrolyte layer including an inorganic lithium ion conductor, to thereby improve stability in strong alkaline conditions and suppress issues such as a decrease in ionic conductivity and crack formation.

In Formula 1, M is a monovalent to a hexavalent element, and may be, for example, a tetravalent element. The tetravalent element may be, for example, Ti, Ge, Sn, or Zr.

Examples of M include titanium (Ti), zirconium (Zr), aluminum (Al), lanthanum (La), scandium (Sc), cerium (Ce), praseodymium (Pr), gadolinium (Gd), europium (Eu), or a combination thereof. Here, aluminum (Al), lanthanum (La), scandium (Sc), and gadolinium (Gd) are all trivalent cationic elements, and cerium (Ce) and praseodymium (Pr) are both trivalent or tetravalent elements, and europium (Eu) is a divalent or trivalent element.

In Formula 1, a may be 0.7 to 0.98, or a is 1.

In Formula 1, x may be 0.01 to 0.05.

The compound of Formula 1 may be, for example, a compound represented by Formula 2 (when y=0 in Formula 1), a compound represented by Formula 3 (when x=0 in Formula 1), or a combination thereof.

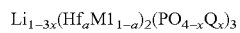

Formula 2

In Formula 2, M1 is a tetravalent element, wherein $0<a\leq 1$ and $0\leq x<1/3$, and Q is F, Cl, Br, I, or a combination thereof.

$$Li_{1+4y}(Hf_aM2_{1-a})_{2-y}(PO_4)_3 \quad \text{Formula 3}$$

In Formula 3, M2 is a tetravalent element, M2 is Ti, Zr, Ge, Sn, or a combination thereof, and $0<a\leq 1$ and $0\leq y<2$.

The compound represented by Formula 1 may be a compound represented by Formula 4, a compound represented by Formula 5, or a combination thereof.

$$Li_{1-3x}Hf_2(PO_{4-x}Q_x)_3 \quad \text{Formula 4}$$

In Formula 4, $0\leq x<1/3$, and Q is F, Cl, Br, I, or a combination thereof.

$$Li_{1+4y}Hf_{2-y}(PO_4)_3 \quad \text{Formula 5}$$

In Formula 5, $0\leq y<2$.

In Formulas 1 to 4, x may be, for example, 0.01 to 0.3, 0.01 to 0.2, 0.01 to 0.1, or 0.01 to 0.05.

In Formulas 1, 3 and 5, y may be, for example, 0.01 to 1.8, 0.01 to 1.5, 0.01 to 1.3, 0.01 to 1.1, 0.01 to 0.8, 0.01 to 0.6, 0.01 to 0.4, 0.01 to 0.2, or 0.01 to 0.1.

The solid electrolyte, wherein the first electrolyte layer comprises a first side and an opposite second side, may comprise the second solid electrolyte layer disposed on the second side of the first electrolyte layer and may further include a third electrolyte layer including a compound represented by Formula 1.

Examples of the compound represented by Formula 1 include $Li_{0.9}Hf_2P_3O_{11.9}F_{0.1}$, $Li_{0.9}Hf_2P_3O_{11.9}Cl_{0.1}$, $Li_{1.4}Hf_{1.9}P_3O_{12}$, $Li_{0.8}Hf_2P_3O_{11.8}Cl_{0.2}$, $Li_{0.8}Hf_2P_3O_{11.8}F_{0.1}Cl_{0.1}$, $Li_{0.9}Hf_{1.8}Zr_{0.2}P_3O_{11.9}F_{0.1}$, $Li_{0.9}Hf_{1.8}Sn_{0.2}P_3O_{11.9}F_{0.1}$, $Li_{0.9}Hf_{1.9}Sn_{0.1}P_3O_{11.9}F_{0.1}$, $Li_{0.9}Hf_{1.9}Ge_{0.1}P_3O_{11.9}F_{0.1}$, $Li_{0.9}Hf_{1.8}Ti_{0.2}P_3O_{11.9}F_{0.1}$, $Li_{0.8}Hf_2P_3O_{11.8}F_{0.2}$, $Li_{0.8}Hf_2P_3O_{11.8}Cl_{0.2}$, $Li_{0.9}Hf_{1.9}Y_{0.1}P_3O_{11.9}F_{0.1}$, $Li_{0.9}Hf_{1.9}Y_{0.1}P_3O_{11.9}Cl_{0.1}$, $Li_{0.8}Hf_2P_3O_{11.8}Br_{0.2}$, $Li_{0.8}Hf_2P_3O_{11.8}Br_{0.1}F_{0.1}$, $Li_{0.8}Hf_2P_3O_{11.8}Br_{0.1}Cl_{0.1}$, $Li_{0.9}Hf_{1.9}Y_{0.1}P_3O_{11.9}Br_{0.1}$, $Li_{0.9}Hf_{1.9}Y_{0.1}P_3O_{11.9}Br_{0.05}F_{0.05}$, $Li_{0.9}Hf_{1.9}Y_{0.1}P_3O_{11.9}Br_{0.05}Cl_{0.05}$, $Li_{0.9}Hf_{1.9}Al_{0.1}P_3O_{11.9}F_{0.1}$, $Li_{0.9}Hf_{1.9}Al_{0.1}P_3O_{11.9}Br_{0.1}$, $Li_{0.9}Hf_{1.9}Al_{0.1}P_3O_{11.9}F_{0.05}Br_{0.05}$, $Li_{0.9}Hf_{1.9}Al_{0.1}P_3O_{11.9}Cl_{0.1}$, $Li_{0.9}Hf_{1.9}Al_{0.1}P_3O_{11.9}Cl_{0.05}Br_{0.05}$, $Li_{0.9}Hf_{1.9}La_{0.1}P_3O_{11.9}F_{0.1}$, $Li_{0.9}Hf_{1.9}La_{0.1}P_3O_{11.9}Br_{0.1}$, $Li_{0.9}Hf_{1.9}La_{0.1}P_3O_{11.9}F_{0.05}Br_{0.05}$, $Li_{0.9}Hf_{1.9}La_{0.1}P_3O_{11.9}Cl_{0.05}Br_{0.05}$, $Li_{0.9}Hf_{1.9}La_{0.1}P_3O_{11.9}Cl_{0.1}$, $Li_{0.9}Hf_{1.9}Gd_{0.1}P_3O_{11.9}F_{0.1}$, $Li_{0.9}Hf_{1.9}Gd_{0.1}P_3O_{11.9}F_{0.05}Br_{0.05}$, $Li_{0.9}Hf_{1.9}Gd_{0.1}P_3O_{11.9}Cl_{0.05}Br_{0.05}$, $Li_{0.9}Hf_{1.9}Gd_{0.1}P_3O_{11.9}Cl_{0.1.9}Cl_{0.1}$, $Li_{0.9}Hf_{1.9}Y_{0.1}P_3O_{11.9}F_{0.05}Cl_{0.05}$, $Li_{0.8}Ti_2P_3O_{11.8}F_{0.1}Cl_{0.1}$, $Li_{0.9}Ti_{1.9}Y_{0.1}P_3O_{11.9}F_{0.05}Cl_{0.05}$, $Li_{0.8}Zr_2P_3O_{11.8}F_{0.1}Cl_{0.1}$, $Li_{0.9}Zr_{1.9}Y_{0.1}P_3O_{11.9}F_{0.05}Cl_{0.05}$, or a combination thereof.

In a solid electrolyte according to an example, a thickness of the first electrolyte layer may be about 5 micrometers (μm) to about 800 μm, about 10 μm to about 600 μm, about 50 μm to about 500 μm, or about 100 μm to about 350 μm. When the thickness of the first electrolyte layer is in the above range, a solid electrolyte having excellent ion conductivity may be provided.

A thickness of the second electrolyte layer is about 500 nanometers (nm) to about 100 μm, about 500 nm to about 50 μm, about 500 nm to about 5 μm, or about 700 nm to about 3 μm. When the thickness of the second electrolyte layer is in the above range, a solid electrolyte having improved stability in strong alkaline conditions may be provided.

The second electrolyte layer may have a thickness that is about 10 percent (%) to about 30%, or about 15% to about 25%, or about 20% less than a thickness of the first electrolyte layer. When the second electrolyte layer, having less ion conductivity than that of the first electrolyte layer, has a thickness in the above ranges, a solid electrolyte with a good overall ion conductivity and having improved stability with respect to a strong base and moisture can be provided.

The inorganic lithium ion conductor included in the first electrolyte layer may be any suitable compound that is used as an inorganic lithium ion conductor.

Examples of the inorganic lithium ion conductor included in the first electrolyte layer may be at least one of a garnet-type compound, an argyrodite-type compound, a lithium super-ionic-conductor (LISICON) compound, a sodium super-ionic-conductor (i.e., NASICON) compound, a lithium (Li) nitride, a lithium (Li) hydride, a perovskite, a lithium halide, or a combination thereof.

A garnet-type compound or a garnet-type ceramic is a compound which is isostructural with a garnet compound. A garnet compound is a compound of the formula $X_3Y_2(SiO_4)_3$, wherein X is a divalent cation, such as $Ca^{2+}$, $Mg^{2+}$, $Fe^{2+}$, $Mn^{2+}$, or a combination thereof, and Y is a trivalent cation, such as $Al^{3+}$, $Fe^{3+}$, $Cr^{3+}$, or a combination thereof. An argyrodite-type compound is a compound which is isostructural with an argyrodite compound. An argyrodite compound is a compound of the formula $Li_{7-x}QCh_{6-x}X_x$, wherein $0\leq x\leq 1$, Q is phosphor or arsenic, Ch is sulfur or selenium, and X is chlorine, bromine or iodine. A LISICON compound, as used herein, refers to a compound with the formula $Li_{2+2x}Zn_{1-x}GeO_4$, wherein $0\leq x<1$. A sodium super-ionic-conductor compound (i.e., a NASICON compound) is a compound which is isostructural with a compound with the chemical formula $Na_{1+x}Zr_2Si_xP_{3-x}O_{12}$, wherein $0<x<3$. A perovskite compound is a compound that is isostructural with perovskite, i.e., $CaTiO_3$.

Specific examples of the inorganic lithium ion conductor may include a garnet-type ceramic $Li_{3+x}La_3M_2O_{12}$ ($0\leq x\leq 5$, M=W, Ta, Te, Nb, and/or Zr), a doped-garnet type ceramic $Li_{3+x}La_3M_2O_{12}$ ($0\leq \leq 5$, M=W, Ta, Te, Nb, and/or Zr, and further comprising a dopant, wherein the dopant is Ge, Ta, Nb, Al, Ga, Sc, or a combination thereof), $Li_{1+x+y}Al_xTi_{2-x}Si_yP_{3-y}O_{12}$ ($0<x<2$ and $0\leq y<3$), $BaTiO_3$, $Pb(Zr_aTi_{1-a})O_3$ (PZT) ($0\leq a\leq 1$), $Pb_{1-x}La_xZr_{1-y}Ti_yO_3$ (PLZT) ($0\leq x<1$ and $0\leq y<1$), $Pb(Mg_{1/3}Nb_{2/3})O_3$—$PbTiO_3$ (PMN-PT), lithium phosphate ($Li_3PO_4$), lithium titanium phosphate ($Li_xTi_y(PO_4)_3$, $0<x<2$ and $0<y<3$), lithium aluminum titanium phosphate ($Li_xAl_yTi_z(PO_4)_3$, $0<x<2$, $0<y<1$, and $0<z<3$), $Li_{1+x+y}(Al_aGa_{1-a})_x(Ti_bGe_{1-b})_{2-x}Si_yP_{3-y}O_{12}$ ($0\leq x\leq 1$, $0\leq y\leq 1$, and $0\leq b\leq 1$), lithium lanthanum titanate ($Li_xLa_yTiO_3$, $0<x<2$ and $0<y<3$), lithium germanium thiophosphate ($Li_xGe_yP_zS_w$, $0<x<4$, $0<y<1$, $0<z<1$, and $0<w<5$), lithium nitride ($Li_xN_y$, $0\leq x<4$ and $0<y<2$), a $Li_xSi_yS_z$ glass ($0\leq x<3$, $0<y<2$, and $0<z<4$), a $Li_xP_yS_z$ glass ($0\leq x<3$, $0<y<3$, and $0<z<7$), $Li_{3x}La_{(2/3)-x}TiO_3$ ($0\leq x\leq 1/6$), $Li_{1+y}Al_yTi_{2-y}(PO_4)_3$ ($0\leq y\leq 1$), $Li_{1+z}Al_zGe_{2-z}(PO_4)_3$ ($0\leq z\leq 1$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$ type ceramics, $Li_7La_3Zr_2O_{12}$, $Li_{10}GeP_2S_{12}$, $Li_{3.25}Ge_{0.25}P_{0.75}S_4$, $Li_3PS_4$, $Li_6PS_5Br$, $Li_6PS_5Cl$, $Li_7PS_5$, $Li_6PS_5I$, $Li_{1.3}Al_{0.3}Ti_{1.7}(PO_4)_3$, $LiTi_2(PO_4)_3$, $LiHf_2(PO_4)_3$, $LiZr_2(PO_4)_3$, $Li_3(NH_2)_2I$, $LiBH_4$, $LiAlH_4$, $LiNH_2$, $Li_{0.34}La_{0.51}TiO_{2.94}$, $LiSr_2Ti_2NbO_9$, $Li_{0.06}La_{0.66}Ti_{0.93}Al_{0.03}O_3$, $Li_{0.34}Nd_{0.55}TiO_3$, $Li_2CdCl_4$, $Li_2MgCl_4$, $Li_2ZnI_4$, $Li_2CdI_4$, $Li_{4.9}Ga_{0.5+\delta}La_3ZR_{1.7}W_{0.3}O_{12}$ ($0\leq \delta<1.6$), $Li_{4.9}Ga0.5+\delta La_3Zr_{1.7}W_{0.3}O_{12}$ ($1.7\leq \delta\leq 2.5$), $Li_{5.39}Ga_{0.5+\delta}La_3Zr_{1.7}W_{0.3}O_{12}$ ($0\leq \delta\leq 1.11$), or a combination thereof.

The inorganic lithium ion conductor may exist as particles. The inorganic lithium ion conductor may have an average particle diameter of about 5 nm to about 500 μm, for example, about 50 nm to about 200 μm, about 100 nm to about 15 μm, or for example, about 300 nm to about 10 μm, and may have a specific surface area of about 0.01 square meters per gram ($m^2/g$) to about 1,000 $m^2/g$, for example, about 0.1 $m^2/g$ to about 500 $m^2/g$, or about 0.5 $m^2/g$ to about 100 $m^2/g$.

The first electrolyte layer may include a phosphate having a titanium-based NASICON crystal structure. The first electrolyte layer may include an inorganic lithium ion conductor having a perovskite crystal structure or a garnet crystal structure. Such a first electrolyte layer exhibits high conductivity characteristics.

According to an example, the first electrolyte layer includes $Li_{1+x+y}Al_xTi_{2-x}Si_yP_{3-y}O_{12}$ (0<x<2 and 0≤y<3).

In a solid electrolyte according to an example, a first electrolyte layer may include $Li_{1+x+y}Al_xTi_{2-x}Si_yP_{3-y}O_{12}$ (0<x<2 and 0≤y<3), and the second electrolyte layer may include a compound represented by Formula 4, a compound represented by Formula 5, or a combination thereof.

$$Li_{1-3x}Hf_2(PO_{4-x}Q_x)_3 \quad \text{Formula 4}$$

In Formula 4, 0≤x<⅓, and Q is F, Cl, Br, I, or a combination thereof,

$$Li_{1+4y}Hf_{2-y}(PO_4)_3 \quad \text{Formula 5}$$

In Formula 5, 0≤y<2.

As the solid electrolyte has a bilayer structure including a second electrolyte layer on the first electrolyte layer, a loss of a metal component and an anion in the inorganic lithium ion conductor of the first electrolyte layer after immersion in a lithium hydroxide (LiOH)-saturated solution may be within about 10%.

A solid electrolyte according to an example may have, after immersion in a lithium hydroxide-saturated solution, an ion conductivity of greater than about $1 \times 10^{-5}$ Siemens per centimeter (S/cm), greater than about $2 \times 10^{-5}$ S/cm, greater than about $3 \times 10^{-5}$ S/cm, greater than about $4 \times 10^{-5}$ S/cm, greater than about $5 \times 10^{-5}$ S/cm, greater than about $6 \times 10^{-5}$ S/cm, greater than about $7 \times 10^{-5}$ S/cm, greater than about $8 \times 10^{-5}$ S/, greater than about $9 \times 10^{-5}$ S/cm, or greater than about $1 \times 10^{-4}$ S/cm. The ion conductivity of the solid electrolyte after immersion in the saturated lithium hydroxide solution may be up to about $1 \times 10^{-3}$ S/cm. As such, the solid electrolyte maintains its ion conductivity even after exposure to a strong base. From this result, it may be confirmed that the solid electrolyte has excellent stability in strong bases. In the present specification, the term "ion conductivity after immersion in a saturated lithium hydroxide solution" refers to an ion conductivity of a solid electrolyte that is maintained at 40° C. for 7 days after immersion in the saturated lithium hydroxide solution.

A solid electrolyte according to an example may have an ion conductivity retention of about 50% to about 90% in a lithium hydroxide (LiOH)-saturated solution. In the present specification, "ion conductivity retention in lithium hydroxide (LiOH) saturated solution" is calculated by Equation 1 below.

Ion Conductivity Retention (%)={(Ion Conductivity After Immersion in Saturated Lithium Hydroxide Solution)/(Ion Conductivity Before Immersion in Saturated Lithium Hydroxide Solution)}×100%      Equation 1

A solid electrolyte according to an example may have an ionic conductivity at 25° C. of greater than about $1 \times 10^{-6}$ S/cm, greater than about $5 \times 10^{-6}$ S/cm, greater than about $8 \times 10^{-6}$ S/cm, greater than about $1 \times 10^{-5}$ S/cm, greater than about $3 \times 10^{-5}$ S/cm, greater than about $7 \times 10^{-5}$ S/cm, greater than about $9 \times 10^{-5}$ S/cm, or greater than about $1 \times 10^{-4}$ S/cm. According to another example, the solid electrolyte may have an ionic conductivity at 25° C. of about $1 \times 10^{-6}$ S/cm to about $1 \times 10^{-3}$ S/cm. As the solid electrolyte according to an example has such a high ionic conductivity, the internal resistance of a lithium air battery comprising such a solid electrolyte may be further decreased.

Techniques such as X-ray diffraction (XRD) analysis, scanning electron microscopy (SEM), transmission electron microscopy (TEM), Inductively coupled plasma (ICP) analysis, and X-ray photoelectron spectroscopy (XPS), may be used to analyze the surface structure and composition of a solid electrolyte according to an example.

A method of preparing a solid electrolyte according to an example will be described below.

The method of preparing a solid electrolyte may include forming a second electrolyte layer including a compound represented by Formula 1 on at least one side of a first electrolyte layer including an inorganic lithium ion conductor.

The formation of a first electrolyte layer comprising a compound represented by Formula 1 on at least one side of the first electrolyte layer comprising an inorganic lithium ion conductor includes coating a mixture comprising a vehicle and a compound represented by Formula 1 and then heat-treating the resultant.

When forming the first electrolyte layer, using the above-described method makes the formation of a thin film easier, compared to using a method such as deposition and sputtering, and provides a further excellent interfacial adhesion between the first electrolyte layer and the second electrolyte layer, thus improving characteristics such as resistance. Accordingly, the second electrolyte layer may have a further enhanced function as a barrier.

The mixture may have, for example, a paste form. As a vehicle, an organic vehicle may be used.

Examples of the organic vehicle may include a binder, such as ethyl cellulose, maleic acid resin, rosin, or a combination thereof, and an organic solvent, such as terpineol, butyl carbitol, 1-dodecanol, or a combination thereof.

For the organic vehicle, an ink vehicle (commercially available from Fuelcellmaterials Inc.) may be used, as an example.

The mixing may be conducted by a method known in the relevant technical field, such as milling, blending, or stirring. For the milling, a ball mill, an air-jet mill, a bead mill, or a roll mill may be used, as an example.

The heat-treatment may be conducted under an oxidizing gas atmosphere or an inert gas atmosphere, for example. The oxidizing gas atmosphere may be made using air or oxygen, for example, and the inert gas atmosphere may be made using nitrogen, argon, or helium. A combination of the aforementioned components may be used.

The temperature elevation rate for the heat-treatment may be about 1 degrees Celsius (° C.)/minute (min) to about 10° C./min.

The temperature of the heat treatment may change in accordance with the thickness of the second electrolyte layer and the type of the coated compound represented by Formula 1, and for example, the heat-treatment may be conducted, for example, at a temperature of about 800° C. to about 1,200° C. When the heat treatment is conducted in the above temperature range, a solid electrolyte with improved stability in moisture and strong bases can be provided.

The heat treatment may be conducted, for example, at a temperature of about 800° C. to about 1100° C., about 850° C. to about 1100° C., or about 900° C. to about 1050° C. A solid electrolyte having a bilayer structure thus obtained not only is chemically stable with respect to alkalinity, but also has reduced resistance, and thus can have improved ionic conductivity.

The method further includes forming a third electrolyte layer including a compound represented by Formula 1 on the first electrolyte layer, wherein the first electrolyte layer comprises a first side and an opposite second side, the second electrolyte layer is disposed on the first side of the first electrolyte layer, and the third electrolyte layer is disposed on the second side of the first electrolyte layer.

The third electrolyte layer may have the same or different composition as the second electrolyte layer.

The solid electrolyte prepared according to the above preparation method may be disposed on a cathode to protect an electrolyte layer from alkaline conditions when charging/discharging a cell.

The first electrolyte layer of a solid electrolyte according to an example may be positioned in contact with a cathode.

The second electrolyte layer of a solid electrolyte according to another example may be positioned in contact with a cathode. When the second electrolyte layer is in contact with the cathode, stability with respect to moisture and alkalinity may be further improved.

A solid electrolyte according to an example may be used as an electrolyte of a lithium air battery. In addition, the solid electrolyte may be used as an electrolyte of a lithium battery, such as an all-solid-state battery.

According to another aspect, an electrochemical device including the above-described solid electrolyte is provided. By including the solid electrolyte that is not only chemically stable but also has high ionic conductivity, the electrochemical device can have improved stability with respect to moisture and strong bases, and thus can efficiently suppress degradations of the electrochemical device.

Examples of the electrochemical device may include, but are not limited to, a battery, an accumulator, a supercapacitor, a fuel cell, a sensor, or an electrochromic device, and may be any device that is used as an electrochemical device in the relevant technical field.

The battery may be, for example, a primary battery or a secondary battery. Examples of the battery may include, but are not limited to, a lithium battery, a sodium battery, and may be any battery being used in the relevant technical field. Examples of the lithium battery may include, but are not limited to, a lithium ion battery, a lithium-air battery, and may be any lithium battery being used in the relevant technical field. Examples of the electrochromic device may include, but are not limited to, an electrochemical mirror, window, screen, and may be any electrochemical device being used in the relevant technical field.

The electrochemical device may be, for example, a lithium metal battery, for example, a lithium air battery. The lithium air battery may include a cathode. The cathode may be an air electrode, which is disposed on a cathode current collector.

The cathode may be, for example, porous. As the cathode is porous, diffusion of air, oxygen, or the like into the cathode may be facilitated.

According to another example, a lithium air battery may include: a cathode; an anode; and an electrolyte positioned between the cathode and the anode, wherein the electrolyte may include the solid electrolyte according to an example described above.

Furthermore, the anode, the cathode, or a combination thereof, may comprise the above-described solid electrolyte. The anode may include lithium.

As a lithium air battery employs the above-described solid electrolyte, stability with respect to moisture and strong bases may be improved, ensuring reversibility in humid or air conditions, and as a result, operations may be facilitated. In addition, the lithium air battery may have improved structural stability and suppressed degradations.

The lithium air battery may include a cathode, and the cathode may be, for example, positioned on a cathode current collector.

The cathode may contain the above-described solid electrolyte. The solid electrolyte may be included in an amount of, for example, about 1 part by weight to about 100 parts by weight, for example, 10 parts by weight to 100 parts by weight, for example, about 50 parts by weight to about 100 parts by weight, for example, about 60 parts by weight to about 100 parts by weight, for example, about 80 parts by weight to about 100 parts by weight, and for example, about 90 parts by weight to about 100 parts by weight, with respect to 100 parts by weight of the cathode. The cathode may be, for example, substantially formed of the solid electrolyte. That is, the cathode may be formed of a solid electrolyte of a bilayer structure including: a first electrolyte layer including an inorganic lithium ion conductor; and a second electrolyte layer disposed on at least one side of the first electrolyte layer and including a compound represented by Formula 1.

It is possible to introduce pores into the cathode by introducing a pore-forming agent when preparing the cathode. The cathode may be in the form of a porous pellet, or a porous sheet, for example, but is not necessarily limited thereto, and may be formed in accordance with a desired battery shape.

The cathode may be permeable to gas, such as oxygen, or air, for example. As such, the cathode is distinguished from conventional cathodes that are substantially impermeable to gases such as oxygen, or air, while only conducting ions. As the cathode is porous and/or gas permeable, oxygen, or air, can be easily diffused into the cathode, and as lithium ions and/or electrons move easily through a solid electrolyte included in the cathode, electrochemical reactions occurring within the cathode due to oxygen, lithium ions, and electrons, can easily proceed.

Electron conductivity and ion conductivity may be further enhanced by further adding a common conductive material, other than the solid electrolyte above, when preparing the cathode. The conductive material may be, for example, porous. As the conductive material has porosity, air can be easily introduced. The conductive material may be any material that has porosity and/or conductivity and is used in the relevant technical field, and for example, may be a carbon-based (i.e. carbonaceous) material having porosity. Examples of the carbon-based material may include, but are not limited to, carbon black type, graphite type, graphene type, active charcoal type, or carbon fiber type material, and may be any material that is used as a carbon-based material in the relevant technical field. The conductive material may be, for example, a metallic material. Examples of the metallic material may include metal fibers, metal mesh, or metal powder. Examples of the metal powder may include copper, silver, nickel, or aluminum. The conductive material may be, for example, an organic conductive material. Examples of the organic conductive material may include a polyphenylene derivative, or a polythiophene derivative. The conductive materials may be used alone, or as a mixture for example. The cathode may include a composite conductor as a conductive material, and the cathode may optionally further include the above-described conductive material other than the composite conductor.

The cathode may further include, for example, a catalyst for oxidation/reduction of oxygen. Examples of the catalyst may include, but are not necessarily limited to, precious metal-based (i.e., metal-containing) catalysts such as platinum, gold, silver, palladium, ruthenium, rhodium, or osmium; oxide-based (i.e., oxide-containing) catalysts such as manganese oxides, iron oxides, cobalt oxides, or nickel oxides; or organic metal-based catalysts such as cobalt phthalocyanine, or may be any material that is used as an oxygen oxidation/reduction catalyst in the relevant technical field.

The catalyst may be, for example, supported on a support. Examples of the support may include an oxide support, a zeolite support, a clay-based (i.e., clay-containing) mineral support, or a carbon support. The oxide support may be, for example, a metal oxide support including Al, Si, Zr, Ti, Ce, Pr, Sm, Eu, Tb, Tm, Yb, Sb, Bi, V, Cr, Mn, Fe, Co, Ni, Cu, Nb, Mo, W, or a combination thereof. The oxide support may include, for example, alumina, silica, zirconium oxide, or titanium dioxide. Examples of the carbon support may include, but are not necessarily limited to, carbon black types such as Ketjenblack, acetylene black, channel black, or lamp black, graphite types such as natural graphite, artificial graphite, or expanded graphite, activated carbon types, carbon fiber types, or may be any material that is used as a support in the relevant technical field.

The cathode may further include, for example, a binder. The binder may include, for example, a thermoplastic resin or a thermosetting resin. Examples of the binder may include, but are not necessarily limited to, one or more of polyethylene, polypropylene, polytetrafluoroethylene (PTFE), polyvinylidene fluoride (PVDF), styrene-butadiene rubber, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinyl ether-tetrafluoroethylene copolymer, ethylene-acrylic acid copolymer, or may be any material that is used as a binder in the relevant technical field.

The cathode may be prepared by mixing the metal oxide and optionally a conductive material, an oxygen oxidation/reduction catalyst, and a binder, and adding a suitable solvent to prepare a cathode slurry, and coating and drying the cathode slurry on a surface of a substrate, or compression-molding the cathode slurry on a substrate for improving an electrode density. The substrate may be, for example, a cathode current collector, a separator, or a solid electrolyte membrane. The cathode current collector may be, for example, a gas diffusion layer. The conductive material may include a composite conductor, and oxygen oxidation/reduction catalysts and binders at the cathode may be absent depending on the type of the cathode desired.

The lithium air battery may include an anode. The anode may include a solid electrolyte according to an example.

The anode may include lithium, a lithium alloy, or a combination thereof.

The anode may be, for example, a lithium metal thin film (i.e., film) or a lithium-based (i.e., lithium-containing) alloy thin film. The lithium-based alloy may be, for example, an alloy of lithium with aluminum, tin, magnesium, indium, calcium, titanium, or vanadium.

The lithium air battery may include an electrolyte positioned between the cathode and the anode.

The electrolyte, as described above, includes a solid electrolyte including: a first electrolyte layer including an inorganic lithium ion conductor; and a second electrolyte layer disposed on at least one side of the first electrolyte layer and including a compound represented by Formula 1. In the solid electrolyte, the second electrolyte layer including a compound represented by Formula 1 is positioned adjacent a cathode or a cathode current collector to thereby act as an oxygen barrier.

The electrolyte may further include, other than the solid electrolyte according to an example, one or more additional solid electrolytes of a solid electrolyte, a gel electrolyte, a liquid electrolyte, or a combination thereof. The solid electrolyte, the gel electrolyte, and the liquid electrolyte are not particularly limited and may be any suitable electrolyte, such as an electrolyte that is used in the relevant technical field.

The solid electrolyte includes a solid electrolyte including an ion-conducting inorganic material, a solid electrolyte including a lithium salt and a polymeric ionic liquid (PIL), a solid electrolyte including a lithium salt and an ionically conducting polymer, a solid electrolyte including an electron-conducting polymer, or a combination thereof, but is not limited thereto, and may be any suitable material that is used as a solid electrolyte in the relevant technical field.

The ion-conducting inorganic material includes glass or amorphous metal ion conductor, a ceramic active metal ion conductor, a glass ceramic active metal ion conductor, or a combination thereof, but is not necessarily limited thereto, and may be any suitable material that is used as an ion-conducting inorganic material in the relevant technical field. The ion-conducting inorganic material may be, for example, ion-conducting inorganic particles, or a molded body in a form of a sheet thereof.

The ion-conducting inorganic material may be $BaTiO_3$, $Pb(Zr_{1-p}Ti_p)O_3$ (PZT) ($0 \leq p \leq 1$), $Pb_{1-x}La_xZr_{1-y}Ti_yO_3$ (PLZT) ($0 \leq x < 1$ and $0 \leq y < 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, $0<x<2$ and $0<y<3$), lithium aluminum titanium phosphate ($Li_xAl_yTi_z(PO_4)_3$, $0<x<2$, $0<y<1$, and $0<z<3$), $Li_{1+x+y}(Al_aGa_{1-a})_x(Ti_bGe_{1-b})_{2-x}Si_yP_{3-y}O_{12}$ ($0 \leq x \leq 1$, $0 \leq y \leq 1$, $0 \leq a \leq 1$ and $0 \leq b \leq 1$), lithium lanthanum titanate ($Li_xLa_yTiO_3$, $0<x<2$ and $0<y<3$), lithium germanium thiophosphate ($Li_xGe_yP_zS_w$, $0<x<4$, $0<y<1$, $0<z<1$ and $0<w<5$), lithium nitride ($Li_xN_y$, $0<x<4$, and $0<y<2$), a $Li_xSi_yS_z$, glass ($0<x<3$, $0<y<2$, and $0<z<4$), a $Li_xP_yS_z$, glass ($0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$ type ceramics, garnet-type ceramics ($Li_{3+x}La_3M_2O_{12}$ (M=Te, Nb, Zr)), or a combination thereof.

The polymeric ionic liquid (PIL) may include, for example, one or more cations of i) ammonium, pyrrolidinium, pyridinium, pyrimidinium, imidazolium, piperidinium, pyrazolium, oxazolium, pyridazinium, phosphonium, sulfonium, triazolium, or a mixture thereof; and one or more anions of ii) $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $CH_3COO^-(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof. Examples of the PIL may include poly(diallyldimethylammonium trifluoromethanesulfonyl)imide(TFSI), poly(1-allyl-3-methylimidazolium trifluoromethanesulfonyl imide), or poly(N-methyl-N-propylpiperidinium bis(trifluoromethanesulfonyl) imide).

The ion-conducting polymer may include, for example, ion-conductive repeating units of ether-based, acryl-based, methacryl-based, siloxane-based monomers, or a combination thereof.

Examples of the ion conducting polymer may include, but are not necessarily limited to, polyethylene oxide (PEO), polyvinyl alcohol (PVA), polyvinylpyrrolidone (PVP), polyvinylsulfone (polysulfone), polypropylene oxide (PPO), polymethyl methacrylate, polyethyl methacrylate, polydimethylsiloxane, polyacrylic acid, polymethacrylic acid, polymethyl acrylate, polyethyl acrylate, poly 2-ethylhexyl acrylate, polybutyl methacrylate, poly 2-ethylhexyl methacrylate, polydecyl acrylate, polyethylene vinyl acetate, phosphate ester polymer, polyester sulfide, polyvinylidene fluoride (PVDF), Li-substituted Nafion, or a combination thereof, and may be any material that is used as an ion conducting polymer in the relevant technical field.

Examples of an electron conducting polymer may include, but are not necessarily limited to, a polyphenylene derivative, or a polythiophene derivative and may be any material that is used as an electron conducting polymer in the relevant technical field.

A gel electrolyte may be obtained, for example, by additionally adding a low-molecular weight solvent to a solid electrolyte positioned between a cathode and an anode. The gel electrolyte may be, for example, a gel electrolyte obtained by additionally adding, to a polymer, a solvent that is a low-molecular weight organic compound, an oligomer. The gel electrolyte may be, for example, a gel electrolyte obtained by additionally adding, to the above-described polymer electrolyte, a solvent that is a low-molecular weight organic compound, an oligomer.

A liquid electrolyte may include a solvent and a lithium salt.

The solvent may include an organic solvent, an ionic liquid, an oligomer, or a combination thereof, but is not necessarily limited to, and may be any material that is liquid at room temperature (25° C.) and may be used as a solvent.

The organic solvent may include, for example, an ether-based solvent, a carbonate-based solvent, an ester-based solvent, a ketone-based solvent, or a combination thererof. The organic solvent may include propylene carbonate, ethylene carbonate, fluoroethylene carbonate, vinyl ethylene carbonate butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=about 500), dimethyl ether, diethyl ether, dibutyl ether, dimethoxyethane, 2-methyltetrahydrofuran, tetrahydrofuran, or a combination thereof, but is not necessarily limited to the aforementioned components and may be any organic solvent that is liquid at room temperature in the relevant technical field.

The ionic liquid (IL) may include, for example, one or more cations of i) ammonium, pyrrolidinium, pyridinium, pyrimidinium, imidazolium, piperidinium, pyrazolium, oxazolium, pyridazinium, phosphonium, sulfonium, triazolium, or a mixture thereof; and one or more anions of ii) $BE_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3$, $Al_2Cl_7^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

The lithium salt may include lithium bis(trifluoromethanesulfonyl)imide (LiTFSI), $LiPF_6$, $LiBF_4$, $LiAsF_6$, $LiClO_4$, $LiNO_3$, (lithium bis(oxalato) borate (LiBOB), $LiCF_3SO_3$, $LIN(SO_2CF_3)_2$, $LIN(SO_2C_2F_5)_2$, $LIN(SO_2F)_2$, $LIC(SO_2CF_3)_3$, $LIN(SO_3CF_3)_2$, $LIC_4F_9SO_3$, $LiAlCl_4$, $CF_3SO_3Li$, or a combination thereof, but is not necessarily limited thereto and may be any material that can be used as a lithium salt in the relevant technical field. The concentration of the lithium salt may be, for example, about 0.01 molar (M) to about 5.0 M, about 0.05 M to about 4.5 M, about 0.1 M to about 4 M, or about 1 M to about 3 M.

The lithium air battery may further include, for example, a separator between the cathode and the anode. The separator may have any composition as long as it can withstand the operating range of the lithium air battery. The separator may include, for example, a polymer nonwoven fabric such as a nonwoven fabric made of a polypropylene material, a nonwoven fabric made of a polyphenylene sulfide material; a porous film of an olefin-based resin, such as polyethylene and polypropylene; glass fiber, or a combination thereof.

The electrolyte may have, for example, a structure in which the separator is impregnated with a solid polymer electrolyte, or a structure in which the separator is impregnated with a liquid electrolyte. An electrolyte having a solid polymer electrolyte impregnated in a separator may be prepared, for example, by placing a solid polymer electrolyte film on one side or both sides of the separator, and simultaneously rolling the same. An electrolyte having a liquid electrolyte impregnated in a separator may be prepared by injecting a liquid electrolyte containing a lithium salt into the separator.

A lithium air battery may be produced by placing an anode on one side surface inside a case, placing an electrolyte layer on the anode, placing a cathode on an electrolyte, placing a porous cathode current collector on the cathode, and placing and pressing a press member, which can deliver air to an air electrode, on the cathode current collector, thereby assembling a cell. The case may be separated into an upper part with which the anode comes in contact, and a lower part with which the air electrode comes in contact, and an insulating resin is interposed between the upper part and the lower part, thereby electrically insulating between the cathode and the anode.

The lithium air battery may be used in both a primary battery and a secondary battery. A shape of the lithium air battery is not particularly limited, and may be, for example, a coin-type, a button-type, a sheet-type, a stack-type, a cylinder-type, a flat-type, or a cone-type. The lithium air battery may be applied to a large-scale battery for an electric vehicle.

Figure 11:
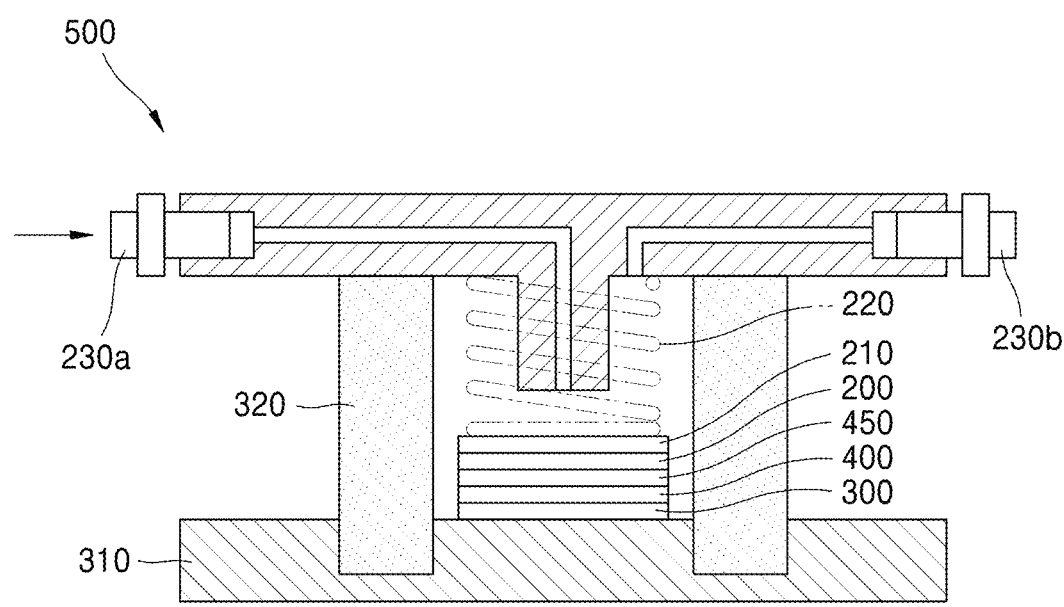
FIG. 11 schematically shows an example of a structure of a lithium air battery.

FIG. 11 schematically shows a structure of a lithium air battery according to an example.

Referring to FIG. 11, a lithium air battery 500 has a structure in which a first electrolyte 400 is interposed between a cathode 200 having oxygen as an active material and adjacent to a first current collector 210, and an anode 300 containing lithium and adjacent to a second current collector 310. The first electrolyte 400 may be a separator impregnated with a liquid electrolyte.

A second electrolyte 450 may be positioned between the cathode 200 and the first electrolyte 400. The second electrolyte 450 may be a solid electrolyte according to one example. For the solid electrolyte, for example, a second electrolyte layer comprising a compound (e.g., a lithium hafnium-based (i.e., hafnium-containing) phosphate) represented by Formula 1 may be positioned adjacent to the cathode 200.

The first current collector 210 is porous, and may also act as a gas diffusion layer capable of air diffusion. A press member 220 capable of delivering air to the cathode may be positioned on the first current collector 210.

The anode 300 may be electrically connected to a case bottom plate (not illustrated). The cathode 200 may be electrically connected to a case top plate (not illustrated). A case 320 electrically disconnects the case top plate and the case bottom plate from each other. The case 320 made of an insulating resin material may be interposed between the cathode 200 and the anode 300, thereby electrically disconnecting the cathode 200 and the anode 300 from each other. Air may be introduced to an air intake hole 230a and discharged through an air discharge hole 230b. The lithium air battery 500 may be stored inside a stainless steel container.

The "air" in the lithium air battery is not limited to atmospheric air, but may include a combination of gases including oxygen, or pure oxygen gas. The term "air" in a broad sense of the word may be applied to all purposes, for example, to an air battery, an air electrode, and the like.

A lithium air battery according to an example may be advantageously applied to all fields in which secondary batteries are employed.

Hereinbelow, the exemplary embodiments will be described in greater details with examples and comparative examples below. However, the following examples are for illustrative purpose only and shall not be construed as limiting the scope of the inventive concept.

EXAMPLES

Preparation of Lithium Hafnium-Based Phosphate

In Preparation Examples below, a lithium hafnium-based phosphate having a composition in Table 1 was prepared.

Preparation Example 1

Lithium precursor $Li_2CO_3$, M1 precursor $HfO_2$, phosphorus precursor $(NH_4)_2HPO_4$, and lithium fluoride (LiF) were mixed in a composition ratio of $Li_{0.9}Hf_2P_3O_{11.9}F_{0.1}$ and were combined and mixed with ethanol, to form a precursor mixture. The precursor mixture was placed in a ball-milling device to be pulverized and mixed for 4 hours. The resulting mixed product was dried and heated to 80° C. at a temperature elevation rate of about 5° C./min, and was subjected to a first heat-treatment for 12 hours under an atmospheric air.

Powder obtained from the first heat-treatment was pulverized and pressed to form a pellet having a diameter of about 1.3 centimeters (cm) and a height of about 0.5 cm. The pellet was subjected to a second heat-treatment at a temperature of 1,200° C. for 4 hours under an air-oxygen atmosphere, to produce a target product. When heating to 1,200° C. for the second heat-treatment, the temperature elevation rate was about 5° C./min.

Preparation Example 2

A lithium hafnium-based phosphate was prepared in the same process as described in Preparation Example 1, except that when preparing the precursor mixture, lithium fluoride (LiF) was not added and the amounts of the respective precursors were stoichiometrically controlled so as to produce $Li_{1.4}Hf_2P_3O_{12}$.

Preparation Example 3

A lithium hafnium-based phosphate was prepared in the same process as described in Preparation Example 1, except that when preparing the precursor mixture, zirconium chloride was further added, the amounts of the respective precursors were stoichiometrically controlled so as to produce a compound having a composition in Table 1, the first heat-treatment was conducted at 800° C. and the second heat-treatment was conducted at 1,250° C.

Preparation Example 3

A lithium hafnium-based phosphate was prepared in the same process as described in Preparation Example 1, except that when preparing the precursor mixture, titanium chloride was further added, the amounts of the respective precursors were stoichiometrically controlled so as to produce a compound having a composition in Table 1, the first heat-treatment was conducted at 800° C. and the second heat-treatment was conducted at 1,250° C.

TABLE 1

| Examples | Composition |
| --- | --- |
| Preparation Example 1 | $Li_{0.9}Hf_2P_3O_{11.9}F_{0.1}$ |
| Preparation Example 2 | $Li_{1.4}Hf_{1.9}P_3O_{12}$ |
| Preparation Example 3 | $Li_{0.9}Hf_{1.9}Zr_{0.1}P_3O_{11.9}F_{0.1}$ |
| Preparation Example 4 | $Li_{0.9}Hf_{1.9}Ti_{0.1}P_3O_{11.9}F_{0.1}$ |

Preparation of Solid Electrolyte

Comparative Example 1

Lithium-Aluminum Titanium Phosphate (LATP) Layer

For a control group, an LATP layer (Ohara Inc., LICGC, thickness 250 μm) including a composition of $Li_2O$—$Al_2O_3$—$SiO_2$—$P_2O_5$—$TiO_2$ was used as Comparative Example 1.

Comparative Example 2

LHPF Layer $Li_{1.4}Hf_{1.9}P_3O_{12}$ powder obtained in Preparation Example 2 and a paste-forming solvent (Ink Vehicle, Fuelcellmaterials Inc.) were mixed in a weight ratio of 3:2 and ball-milled to form a paste, as a control group. The paste was bar-coated on a substrate and subjected to a heat-treatment at 1,000° C. under atmospheric conditions for 6 hours, to form an LHPF layer having a monolayer structure, to a thickness of 3 μm.

Example 1

$Li_{0.9}Hf_2P_3O_{11.9}F_{0.1}$ powder obtained in Preparation Example 1 and a paste-forming solvent (Ink Vehicle, Fuelcellmaterials Inc.) were mixed in a weight ratio of 3:2 and ball-milled to form a paste.

The paste was coated on the LATP layer prepared according to Comparative Example 1 above and subjected to a heat-treatment at 1,000° C. for 6 hours under atmospheric conditions, to form a solid electrolyte having a bilayer structure. In this solid electrolyte, the thickness of a second electrolyte layer was about 3 μm, and the thickness of a first electrolyte layer was about 250 μm.

Examples 2-4

Solid electrolytes were prepared in the same process as described in Example 1, except that the compounds of Preparation Examples 2 to 4 in Table 1 above were used, respectively, instead of the $Li_{0.9}Hf_2P_3O_{11.9}F_{0.1}$ powder obtained according to Preparation Example 1.

Example 5 and Example 6

The same process as described in Example 1 was performed, except that the thicknesses of the first electrolyte layer and the second electrolyte layer were changed as shown in Table 2 below.

TABLE 2

| Examples | Thickness of First Electrolyte Layer | Thickness of Second Electrolyte Layer |
|---|---|---|
| Examples 1 to Example 4 | 250 μm | 3 μm |
| Example 5 | 250 μm | 0.5 μm (500 nm) |
| Example 6 | 250 μm | 5 μm |
| Example 7 | 720 μm | 90 μm |

Comparative Example 3

When preparing a solid electrolyte, the LATP of Comparative Example 1, the $Li_{0.9}Hf_2P_3O_{11.9}F_{0.1}$ powder obtained according to Preparation Example 1, and a paste-forming solvent (Ink Vehicle, Fuelcellmaterials Inc.) were mixed in a ratio of 3:2, and ball-milled to form a paste. The paste was coated on a substrate and heat-treated at 1,000° C. under atmospheric conditions for 6 hours, and then separated from the substrate, to form a solid electrolyte having a monolayer structure.

Preparation of Lithium Air Battery

Preparation Example 1

A cathode slurry was prepared by mixing 40 parts by weight of carbon (Super-P), 10 parts by weight of polytetrafluoroethylene (PTFE), and 50 parts by weight of N-methylpyrrolidone (NMP), and the slurry was coated and rolled to form a cathode mix sheet. The cathode mix sheet was compressed on a stainless steel mesh, and then dried under vacuum in an oven at 100° C. for 120 minutes, to produce a cathode.

A hole sized to 1 cm×1 cm was punched in the center of an aluminum film (polypropylene coated aluminum film, 200 μm) sized 5 cm×5 cm, and by using an adhesive, the solid electrolyte of Comparative Example 1, sized to 1.4 cm×1.4 cm, was filled in the hole, to form a first aluminum film, which is in part made of the solid electrolyte of Comparative Example 1. Next, a new second aluminum film sized to 5 cm×5 cm, a copper current collector (thickness 20 μm), a lithium foil (1.4 cm×1.4 cm, thickness 100 μm), a Celgard-3501 separator manufactured by Celgard, having a thickness of 25 μm and made of a polypropylene material impregnated with an electrolyte solution containing a mixture of 1M lithium bis(trifluoromethanesulfonyl)imide (LiTFSI) and propylene carbonate (PC), and the first aluminum film prepared above, were stacked and heated and bonded under vacuum, to produce an aluminum pouch-type protected lithium anode.

The protected lithium anode was mounted in a stainless steel case, and a cathode provided with the Celgard-3501 separator, which is made of a polypropylene material and has a thickness of 25 μm, was set on the side opposite to the anode. Subsequently, a porous gas diffusion layer made of carbon fibers was positioned on the cathode, and a foam nickel plate was positioned thereon, and a press member capable of delivering air to the cathode was placed thereon to apply pressure, to thereby form a lithium air battery.

Preparation Examples 2-4

A lithium air battery was prepared according to the same process as described in Preparation Example 1, except that the solid electrolytes of Examples 1 to 4 were used, respectively, instead of the solid electrolyte of Example 1.

Comparative Preparation Examples 1-2

A lithium air battery was prepared according to the same process as described in Preparation Example 1, except that the solid electrolytes of Comparative Examples 1 and 2 were used, respectively, instead of the solid electrolyte of Example 1.

Evaluation Example 1

Figure 2:
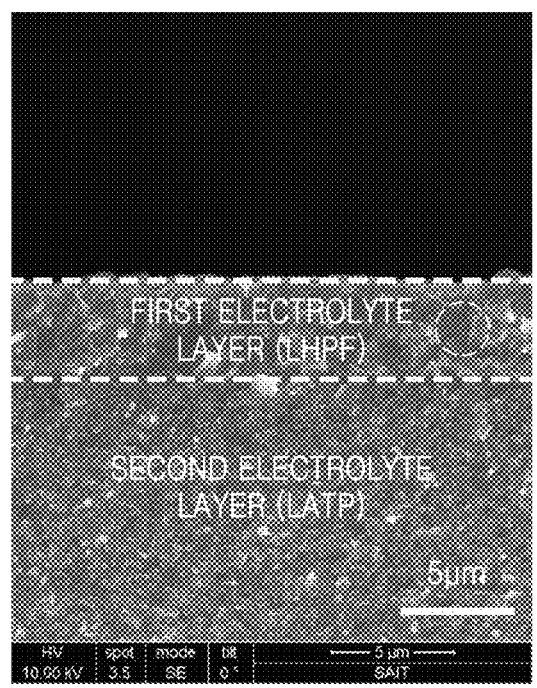
FIG. 2 shows a result of a scanning electron microscopy (SEM) analysis of a cross-section of the solid electrolyte prepared in Example 1.
Figure 3:
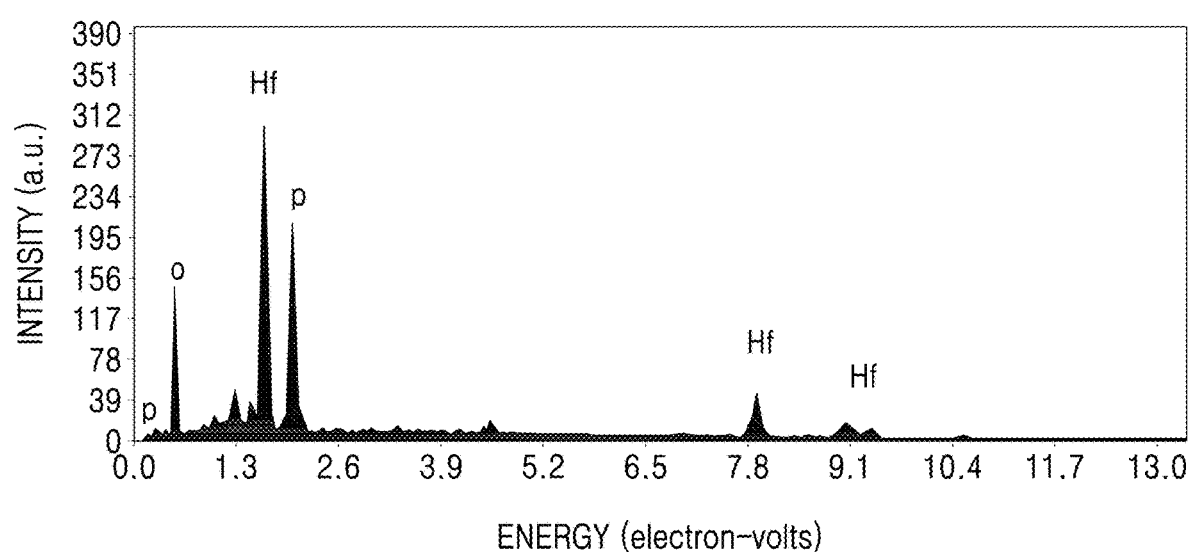
FIG. 3 is a graph of intensity (arbitrary units, a.u.) vs. energy (electron-volts) and shows a result of an energy dispersive X-ray spectroscopy (EDS) analysis on a circled region of the first electrolyte layer in FIG. 2.

Scanning Electron Microscopy (SEM) and Energy Dispersive X-Ray Spectroscopy (EDS) Analyses SEM and EDS analyses were performed on a cross-section of the solid electrolyte prepared in Example 1. Analysis results are shown in FIG. 2 and FIG. 3. The Nova NanoSEM by FEI Inc. was used for SEM and EDS analyses.

FIG. 2 shows SEM analysis results, and FIG. 3 shows EDS analysis results for a circled region in the first electrolyte layer in FIG. 2.

In the solid electrolyte of Example 1, as can be seen in FIG. 2, a first electrolyte layer (LNPF) coating layer was formed to a thickness of about 3 μm on top of a second electrolyte layer (LATP). In addition, it could be seen that the first electrolyte layer and the second electrolyte layer are successfully bonded together without gaps or defects at the interface therebetween. In addition, referring to FIG. 3, it could be seen that the first electrolyte layer is of a composition containing hafnium.

Evaluation Example 2

X-ray Diffraction Analysis I

Figure 4:
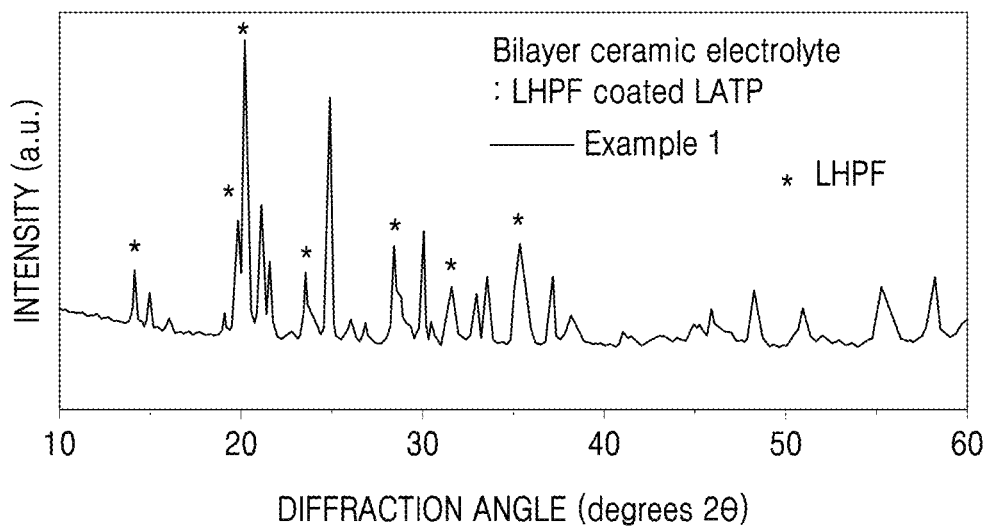
FIG. 4 is a graph of intensity (arbitrary units, a.u.) vs. diffraction angle (degrees 2θ) and shows a result of an X-ray diffraction analysis on the solid electrolyte of Example 1.

The solid electrolyte of Example 1 was measured for an XRD spectrum, and a result thereof is shown in FIG. 4. D8

Advance by Bruker Inc. was used for X-ray Diffraction analyses, and Cu Kα radiation was used for XRD spectrum measurement.

The result of XRD spectrum analysis is as shown in FIG. 4.

As can be seen in FIG. 4, it was confirmed that the solid electrolytes of Comparative Example 1 ($LiHf_2P_3O_{12}$) and Example 1 were indexed as NASICON structure materials.

Evaluation Example 3

Ion Conductivity Evaluation

Gold (Au) was deposited by sputtering on top and bottom surfaces of the solid electrolytes of Examples 1-2 and Comparative Examples 1-2, and by using an impedance analyzer and by the 2-probe method, impedances of the resulting samples were measured. The frequency range was 1 hertz (Hz) to 1 megahertz (MHz), and the amplitude voltage was 100 millivolts (mV). The measurement was made at 30° C. under an ambient atmosphere. Resistance values were obtained from the arc of the Nyquist plot for the impedance measurement results, and the results thereof are shown in FIG. 5.

Figure 5:
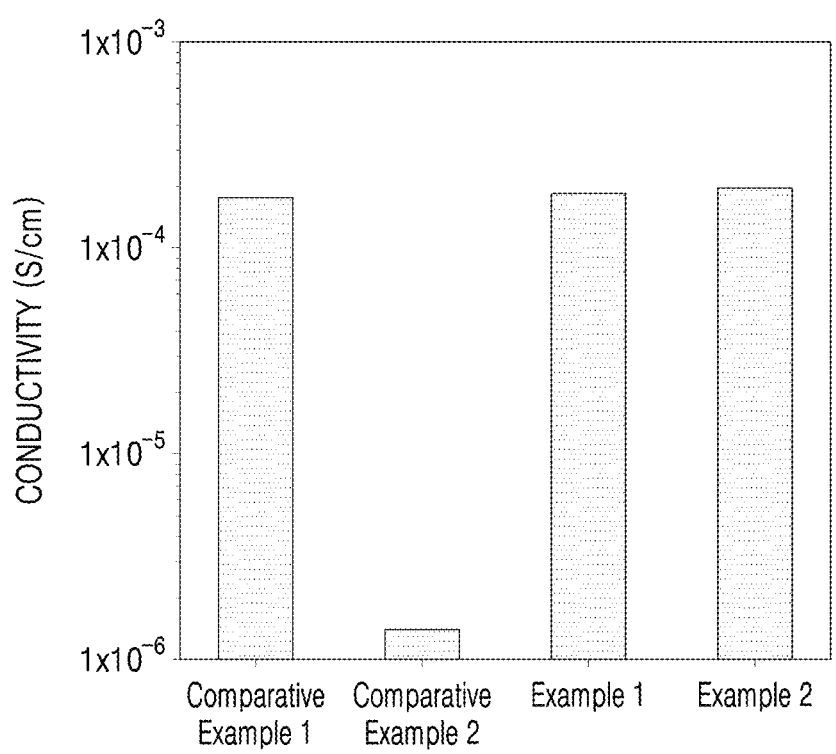
FIG. 5 is a histogram of conductivity (Siemens per centimeter, S/cm) for the solid electrolytes of Example 1-2, a lithium-aluminum titanium phosphate (LATP) plate of Comparative Example 1, and the solid electrolyte of Comparative Example 2.

The solid electrolytes prepared in Examples 1 and 2, as can be seen in FIG. 5, were each found to maintain an ionic conductivity of about $9 \times 10^{-3}$ S/cm as in Comparative Example 1. From this result, it was confirmed that the solid electrolytes prepared in Examples 1 and 2, despite containing an LHPF layer with low ion conductivity, showed excellent ion conductivity to a level comparable to the ion conductivity of the LATP layer of Comparative Example 1. Here, the LHPF layer had a uniform and small thickness.

Evaluation Example 4

Evaluation of Stability in Moisture/Strong Bases

Figure 6:
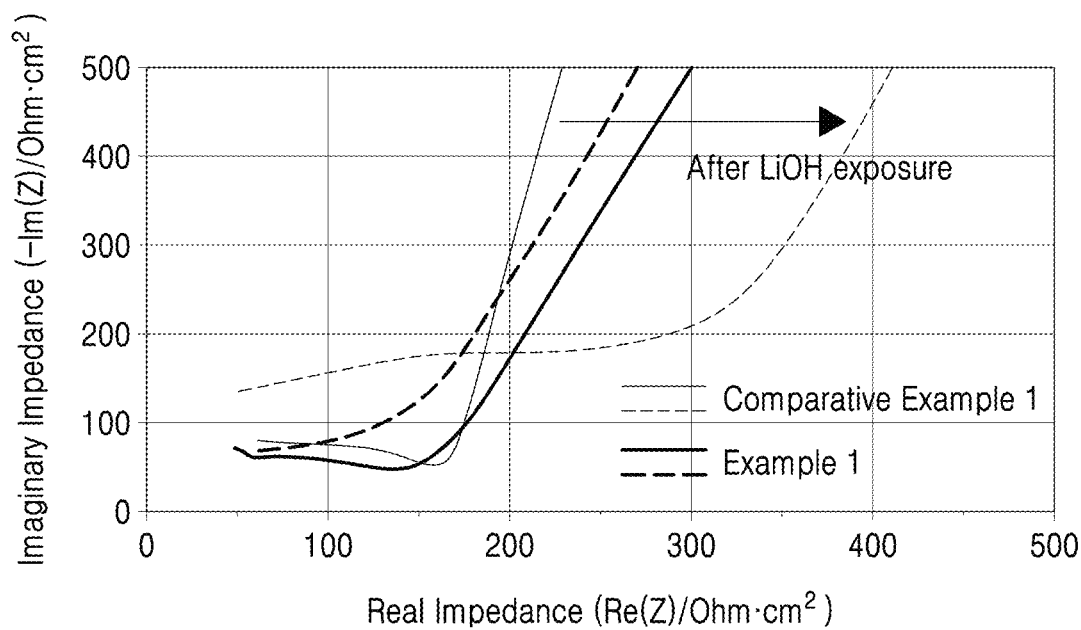
FIG. 6 is a graph of imaginary impedance (−Im(Z), ohms·square centimeter, $\Omega \cdot cm^2$) vs. real impedance (Re(Z), $\Omega \cdot cm^2$) that shows a comparison between resistance values of the solid electrolytes prepared in Comparative Example 1 and Example 1, evaluated by the same method after immersion and standing in a lithium hydroxide (LiOH) aqueous solution, and resistance values before and after exposure to LiOH.

The solid electrolytes prepared in Example 1 and Comparative Example 1 were immersed in a 1M lithium hydroxide (LiOH) aqueous solution and allowed to rest therein at 40° C. for 1 week, and then resistance values thereof were measured by the same method above, to evaluate stability in moisture/strong bases. Resistance values before and after LiOH exposure were compared, and the results thereof are shown in FIG. 6. It was found that the solid electrolyte prepared in Example 1, as can be seen in FIG. 6, had little decrease or increase in resistance after exposure to the lithium hydroxide solution, compared to Comparative Example 1. From these results, it could be confirmed that the solid electrolytes of Examples 1-4 had improved stability in moisture and improved stability in strong bases, compared to the LATP of Comparative Example 1.

With respect to the solid electrolytes prepared according to Example 2 to Example 4, a change in conductivity of the solid electrolyte of Example 1 described above, after exposure to 1M lithium hydroxide (LiOH) aqueous solution, was investigated.

As a result, it was found that the solid electrolytes prepared according to Example 2 to Example 4 maintained ion conductivity to a level comparable to that of the solid electrolyte of Example 1. From this result, it could be confirmed that the solid electrolytes prepared according to Example 2 to Example 4 had improved stability in moisture and bases.

In addition, the solid electrolytes prepared according to Example 2 to Example 4 were immersed in a saturated lithium hydroxide (LiOH) aqueous solution and allowed to stand at 40° C. for 1 week, and surface layer compositions thereof were examined by SEM.

Figure 8A:
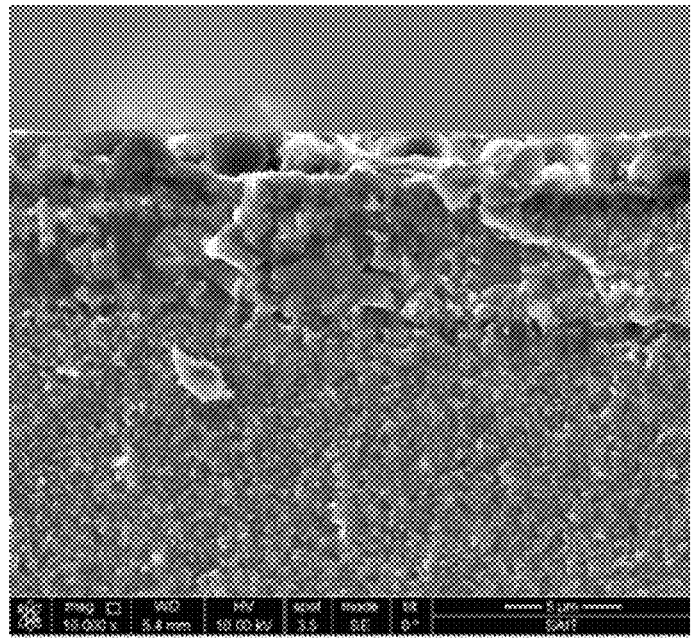
FIG. 8A shows an SEM analysis photo of the solid electrolyte of Example 1 after 1M LiOH exposure.
Figure 8B:
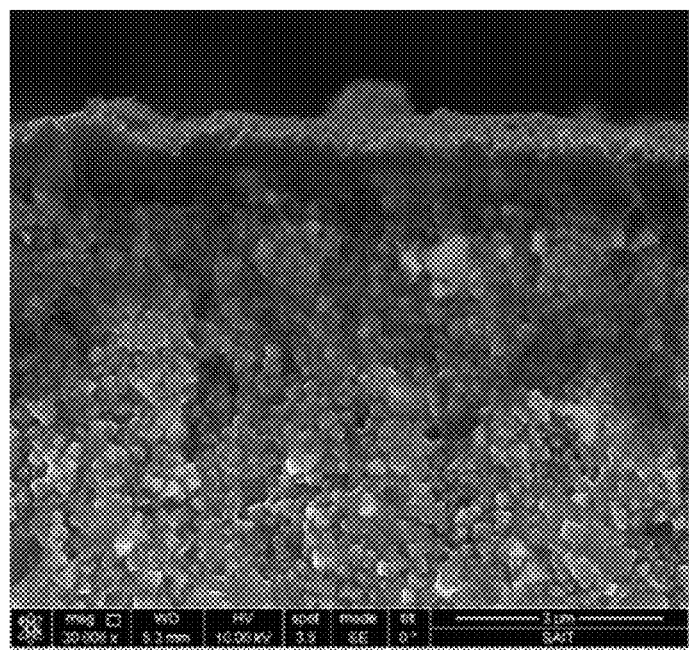
FIG. 8B and FIG. 8C show SEM analysis photos of the solid electrolyte of Comparative Example 1 after LiOH exposure.
Figure 8C:
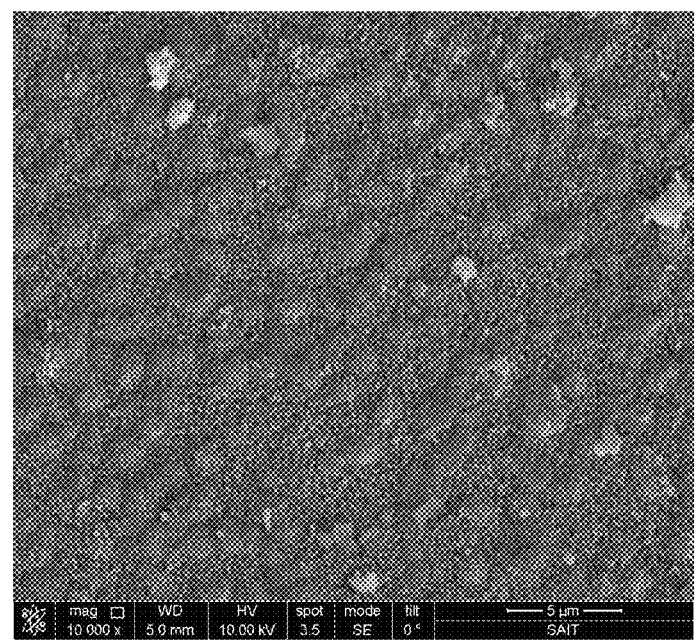

FIG. 8A is an SEM analysis photograph of the solid electrolyte of Example 1 after exposure to 1M LiOH, and FIG. 8B to FIG. 8C are SEM analysis photographs of the solid electrolyte of Comparative Example 1 after exposure to 1M LiOH.

In view of the foregoing, the solid electrolyte of Example 1, even after exposure to LiOH, maintained, and stably retained the initial shape without formation of micropores on the surface. From this result, it could be confirmed that the solid electrolyte of Example 1 had excellent stability in moisture and strong bases and thus suffered no surface micro-changes.

Further, it could be confirmed that the solid electrolyte of Example 1 maintained the initial shape.

Meanwhile, the solid electrolyte of Comparative Example 1, as shown in FIG. 8B, had micropores formed on the surface and contained LATP of a changed composition. In addition, referring to FIG. 8C, it could be confirmed that the solid electrolyte of Comparative Example 1, after immersion in the LiOH aqueous solution, showed an LATP surface with a porous surface formed therein.

Evaluation Example 5

XRD Analysis II

The solid electrolytes prepared in Example 1 was immersed in a 1M lithium hydroxide (LiOH) aqueous solution and allowed to stand at 40° C. for 1 week, and changes resulting therefrom were examined by X-ray diffraction analysis. D8 Advance by Bruker Inc. was used for X-ray Diffraction analyses, and Cu Kα radiation was used for XRD spectrum measurement.

Figure 7:
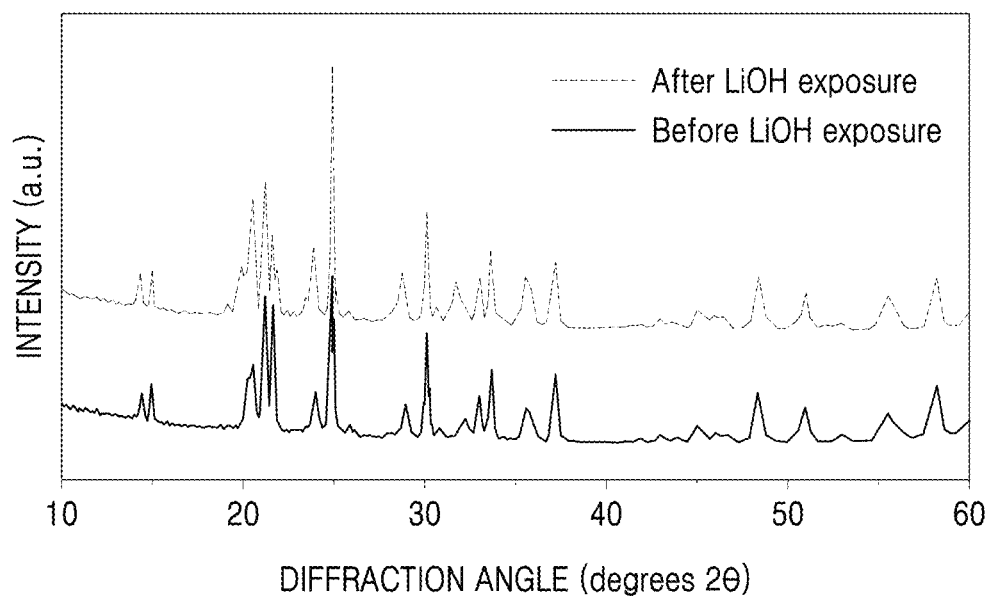
FIG. 7 is a graph of intensity (a.u.) vs. diffraction angle (degrees 2θ) and shows a result of an X-ray diffraction (XRD) analysis on the solid electrolyte of Example 1 before and after LiOH exposure.

The result of analysis is shown in FIG. 7.

It was found that the solid electrolyte of Example 1 had well maintained the crystal structures after exposure to the lithium hydroxide aqueous solution, and thus exhibits improved stability in strong bases.

Evaluation Example 6

Evaluation of Charge-Discharge Characteristics of Lithium Air Battery

Figure 9A:
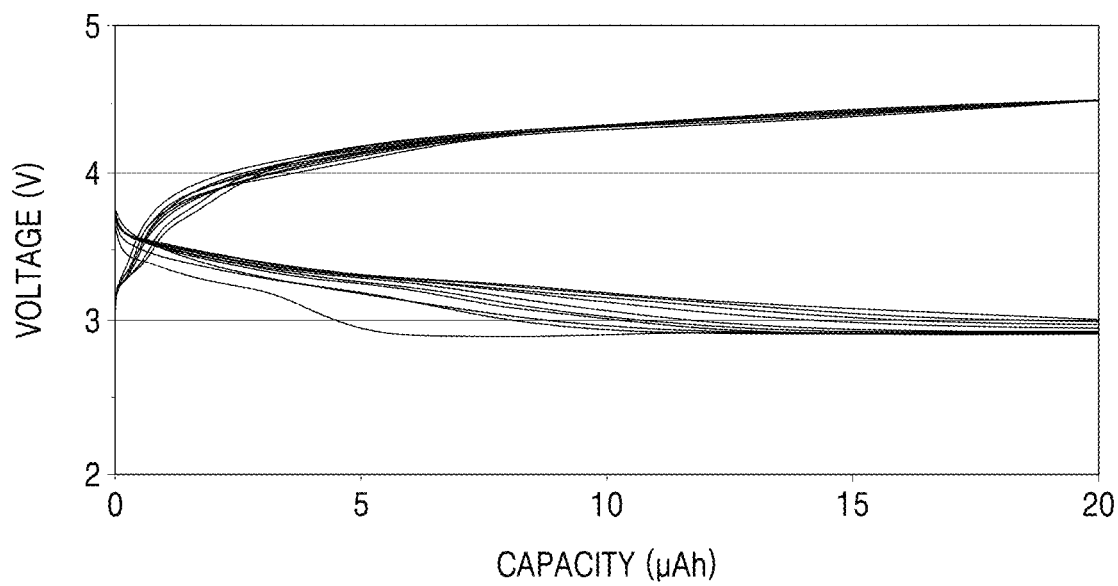
FIG. 9A is graph of voltage (V vs. $Li^+/Li$) vs. capacity (microampere-hours, μAh) and shows a charge-discharge test result of a lithium air battery using the solid electrolyte of Example 1.
Figure 9B:
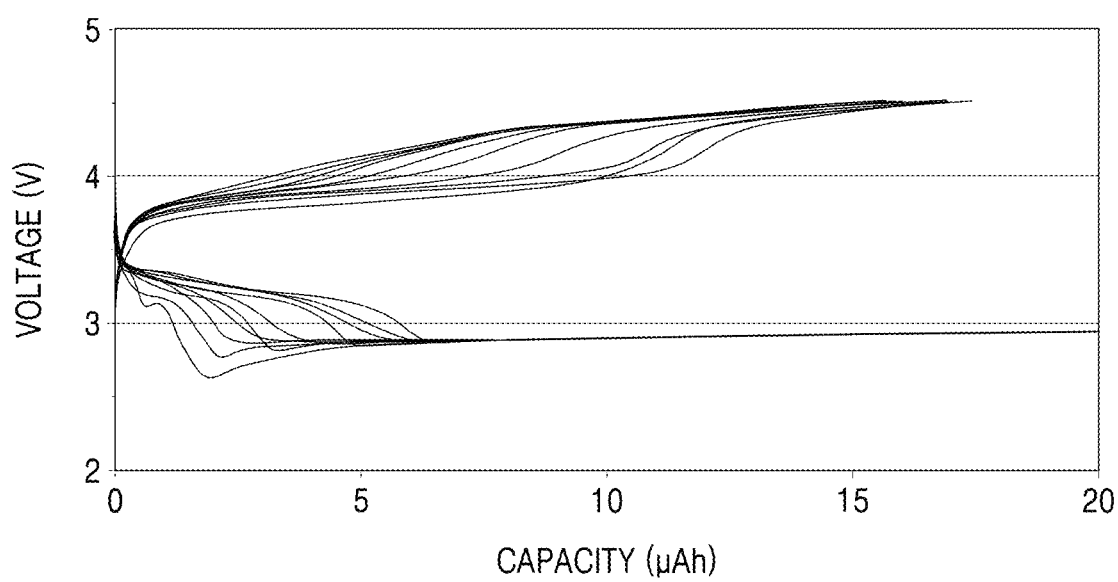
FIG. 9B is graph of voltage (V vs. $Li^+/Li$) vs. capacity (microampere-hours, μAh) and shows a charge-discharge test result of a lithium air battery using the solid electrolyte of Comparative Example 1.
Figure 10:
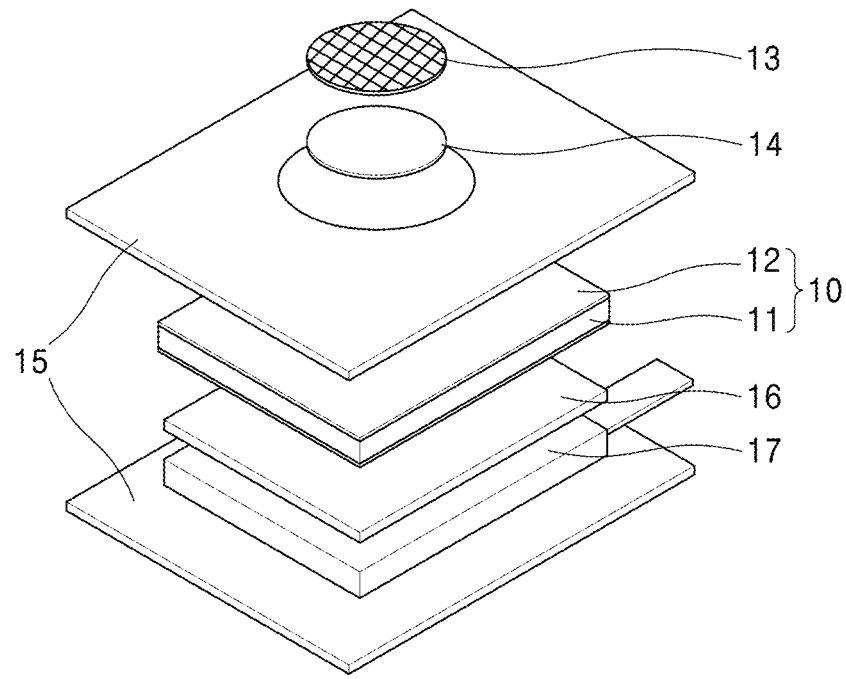
FIG. 10 schematically shows a structure of a lithium air battery prepared according to Evaluation Example 6.

Referring to FIG. 10, in Example 1 and Comparative Example 1, a platinum cathode 14 is formed on a solid electrolyte 10 by sputtering platinum, and a platinum mesh 13 is positioned thereon. In addition, an interlayer 16 and a lithium anode 17 are sequentially deposited on the other side of the solid electrolyte 10 to prepare a structure, and the structure is accommodated in a pouch 15, to form a lithium air battery. As the interlayer 16, a separator (Celgard 3501) impregnated with an electrolyte (1M lithium bis(trifluoromethanesulfonyl)imide (LiTFSI) in propylene carbonate (PC)) was used. Each lithium air battery prepared in the above process was discharged to 2.0 V (vs. Li) at a constant current rate of 0.01 milliamperes per square centimeter ($mA/cm^2$) by applying an electric current of 5 microamperes (μA) at 40° C. under an atmosphere of 1 standard atmosphere (atm) oxygen and 100% humidity, and then charged to 4.25 V at the same current rate. This charge-discharge cycle was performed 10 times. The results of the charge-discharge test of the respective lithium air batteries were examined. The results of the charge-discharge test of lithium air batteries using the solid electrolytes of Example 1 and Comparative Example 1 are as shown in FIG. 9A and FIG. 9B.

As a result of the charge-discharge test, an unstable peak, as shown in FIG. 9B, was observed from a lithium air battery employing the solid electrolyte of Comparative Example 1.

Meanwhile, it was observed that the lithium air battery employing the solid electrolyte of Example 1 has a charge-discharge profile where initial side-reactions were suppressed, and as a result, has improved stability and thus, improved lifetime, compared to the lithium air battery having the solid electrolyte of Comparative Example 1.

The solid electrolyte according to an example has excellent ion conductivity and improved stability in moisture and alkaline conditions. By using such a solid electrolyte, a secondary battery having improved lifetime characteristics can be prepared.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid electrolyte comprising:
   a first electrolyte layer comprising an inorganic lithium ion conductor; and
   a second electrolyte layer disposed on at least one side of the first electrolyte layer and comprising a compound represented by Formula 1

$$Li_{1-3x+4y}(Hf_aM_{1-a})_{2-y}(PO_{4-x}Q_x)_3 \quad \text{Formula 1}$$

wherein, in Formula 1, M is at least one of a monovalent to a hexavalent element, wherein $0 < a \leq 1$, $0 \leq x < 1/3$, and $0 \leq y < 2$, and Q is F, Cl, Br, I, a pseudohalogen, or a combination thereof.

2. The solid electrolyte of claim 1, wherein in Formula 1, a is 0.7 to 0.98, or a is 1.

3. The solid electrolyte of claim 1, wherein in Formula 1, x is 0.01 to 0.05.

4. The solid electrolyte of claim 1, wherein the compound represented by Formula 1 is a compound represented by Formula 2, a compound represented by Formula 3, or a combination thereof $$Li_{1-3x}(Hf_aM1_{1-a})_2(PO_{4-x}Q_x)_3 \quad \text{Formula 2}$$

wherein, in Formula 2, M1 is a tetravalent element, wherein $0 < a \leq 1$ and $0 \leq x < 1/3$, and Q is F, Cl, Br, I, or a combination thereof, or $$Li_{1+4y}(Hf_aM2_{1-a})_{2-y}(PO_4)_3 \quad \text{Formula 3}$$

wherein, in Formula 3, M2 is a tetravalent element and is Ti, Zr, Ge, Sn, or a combination thereof, and $0 < a \leq 1$ and $0 \leq y < 2$.

5. The solid electrolyte of claim 1, wherein the compound represented by Formula 1 is a compound represented by Formula 4, a compound represented by Formula 5, or a combination thereof $$Li_{1-3x}Hf_2(PO_{4-x}Q_x)_3 \quad \text{Formula 4}$$

wherein, in Formula 4, $0 \leq x < 1/3$, and Q is F, Cl, Br, I, or a combination thereof, or $$Li_{1+4y}Hf_{2-y}(PO_4)_3 \quad \text{Formula 5}$$

wherein, in Formula 5, $0 \leq y < 2$.

6. The solid electrolyte of claim 1,
   wherein the first electrolyte layer comprises a first side and an opposite second side, wherein the second electrolyte layer is disposed on the first side of the first electrolyte layer, and
   wherein the solid electrolyte further comprises a third electrolyte layer disposed on the second side of the first electrolyte layer.

7. The solid electrolyte of claim 1, wherein the compound represented by Formula 1 is $Li_{0.9}Hf_2P_3O_{11.9}F_{0.1}$, $Li_{0.9}Hf_2P_3O_{11.9}Cl_{0.1}$, $Li_{1.4}Hf_{1.9}P_3O_{12}$, $Li_{0.8}Hf_2P_3O_{11.8}Cl_{0.2}$, $Li_{0.8}Hf_2P_3O_{11.8}F_{0.1}Cl_{0.1}$, $Li_{0.9}Hf_{1.8}Zr_{0.2}P_3O_{11.9}F_{0.1}$, $Li_{0.9}Hf_{1.8}Sn_{0.2}P_3O_{11.9}F_{0.1}$, $Li_{0.9}Hf_{1.9}Sn_{0.1}P_3O_{11.9}F_{0.1}$, $Li_{0.9}Hf_{1.9}Ge_{0.1}P_3O_{11.9}F_{0.1}$, $Li_{0.9}Hf_{1.8}Ti_{0.2}P_3O_{11.9}F_{0.1}$, $Li_{0.8}Hf_2P_3O_{11.8}F_{0.2}$, $Li_{0.8}Hf_2P_3O_{11.8}Cl_{0.2}$, $Li_{0.9}Hf_{1.9}Y_{0.1}P_3O_{11.9}F_{0.1}$, $Li_{0.9}Hf_{1.9}Y_{0.1}P_3O_{11.9}Cl_{0.1}$, $Li_{0.8}Hf_2P_3O_{11.8}Br_{0.2}$, $Li_{0.8}Hf_2P_3O_{11.8}Br_{0.1}F_{0.1}$, $Li_{0.8}Hf_2P_3O_{11.8}Br_{0.1}Cl_{0.1}$, $Li_{0.9}HF_{1.9}Y_{0.1}P_3O_{11.9}Br_{0.1}$, $Li_{0.9}Hf_{1.9}Y_{0.1}P_3O_{11.9}Br_{0.05}F_{0.05}$, $Li_{0.9}Hf_{1.9}Y_{0.1}P_3O_{11.9}Br_{0.05}Cl_{0.05}$, $Li_{0.9}Hf_{1.9}Al_{0.1}P_3O_{11.9}F_{0.1}$, $Li_{0.9}Hf_{1.9}Al_{0.1}P_3O_{11.9}Br_{0.1}$, $Li_{0.9}Hf_{1.9}Al_{0.1}P_3O_{11.9}F_{0.05}Br_{0.05}$, $Li_{0.9}Hf_{1.9}Al_{0.1}P_3O_{11.9}Cl_{0.1}$, $Li_{0.9}Hf_{1.9}Al_{0.1}P_3O_{11.9}Cl_{0.05}Br_{0.05}$, $Li_{0.9}Hf_{1.9}La_{0.1}P_3O_{11.9}F_{0.1}$, $Li_{0.9}Hf_{1.9}La_{0.1}P_3O_{11.9}Br_{0.1}$, $Li_{0.9}Hf_{1.9}La_{0.1}P_3O_{11.9}F_{0.05}Br_{0.05}$, $Li_{0.9}Hf_{1.9}La_{0.1}P_3O_{11.9}Cl_{0.05}Br_{0.05}$, $Li_{0.9}Hf_{1.9}La_{0.1}P_3O_{11.9}Cl_{0.1}$, $Li_{0.9}Hf_{1.9}Gd_{0.1}P_3O_{11.9}F_{0.1}$, $Li_{0.9}Hf_{1.9}Gd_{0.1}P_3O_{11.9}F_{0.05}Br_{0.05}$, $Li_{0.9}Hf_{1.9}Gd_{0.1}P_3O_{11.9}Cl_{0.05}Br_{0.05}$, $Li_{0.9}Hf_{1.9}Gd_{0.1}P_3O_{11.9}Cl_{0.1}$, $Li_{0.9}Hf_{1.9}Y_{0.1}P_3O_{11.9}F_{0.05}Cl_{0.05}$, $Li_{0.8}Ti_2P_3O_{11.8}F_{0.1}Cl_{0.1}$, $Li_{0.9}Ti_{1.9}Y_{0.1}P_3O_{11.9}F_{0.05}Cl_{0.05}$, $Li_{0.8}Zr_2P_3O_{11.8}F_{0.1}Cl_{0.1}$, $Li_{0.9}Zr_{1.9}Y_{0.1}P_3O_{11.9}F_{0.05}Cl_{0.05}$, $Li_{0.9}Hf_{1.9}Zr_{0.1}P_3O_{11.9}F_{0.1}$, $Li_{0.9}Hf_{1.9}Ti_{0.1}P_3O_{11.9}F_{0.1}$, or a combination thereof.

8. The solid electrolyte of claim 1, wherein the first electrolyte layer has a thickness of about 5 micrometers to about 800 micrometers.

9. The solid electrolyte of claim 1, wherein the second electrolyte layer has a thickness of about 500 nanometers to about 100 micrometers.

10. The solid electrolyte of claim 1, wherein the second electrolyte layer has a thickness which is about 10 percent to about 30 percent less than a thickness of the first electrolyte layer.

11. The solid electrolyte of claim 1, wherein the inorganic lithium ion conductor is a garnet-type compound, an argyrodite-type compound, a lithium super-ionic-conductor compound, a sodium super-ionic-conductor compound, a lithium nitride, a lithium hydride, a perovskite, a lithium halide, or a combination thereof.

12. The solid electrolyte of claim 1, wherein the inorganic lithium ion conductor comprises a garnet-type ceramic of the formula $Li_{3+x}La_3M_2O_{12}$ wherein ($0 \leq x \leq 5$, M is W, Ta, Te, Nb, Zr, or a combination thereof, a doped-garnet type ceramic of the formula $Li_{3+x}La_3M_2O_{12}$ wherein ($0 \leq x \leq 5$, M is W, Ta, Te, Nb, Zr, or a combination thereof, and further comprising a dopant, wherein the dopant is Ge, Ta, Nb, Al, Ga, Sc, or a combination thereof, $Li_{1+x+y}Al_xTi_{2-x}Si_yP_{3-y}O_{12}$ wherein $0 \leq x < 2$ and $0 \leq y < 3$, $BaTiO_3$, $Pb(Zr_aTi_{1-a})O_3$ wherein $0 \leq a \leq 1$, $Pb_{1-x}La_xZr_{1-y}Ti_yO_3$ wherein $0 \leq x < 1$ and $0 \leq y < 1$, $Pb(Mg_{1/3}Nb_{2/3})O_3$—$PbTiO_3$, $Li_3PO_4$, $Li_xTi_y$ $(PO_4)_3$ wherein $0<x<2$ and $0<y<3$, $Li_xAl_yTi_z(PO_4)_3$ wherein $0<x<2$, $0<y<1$, and $0<z<3$, $Li_{1+x+y}(Al_aGa_{1-a})_x(Ti_bGe_{1-b})_{2-x}Si_yP_{3-y}O_{12}$ wherein $0\leq x\leq 1$, $0\leq y\leq 1$, $0\leq a\leq 1$, and $0<b\leq 1$, $Li_xLa_yTiO_3$ wherein $0<x<2$ and $0<y<3$, $Li_xGe_yP_zS_w$, wherein $0<x<4$, $0<y<1$, $0<z<1$ and $0<w<5$, $Li_xN_y$ wherein $0<x<4$ and $0<y<2$, a $Li_xSi_yS_z$ glass wherein $0\leq x<3$, $0<y<2$ and $0<z<4$, a $Li_xP_yS_z$ glass wherein $0\leq x<3$, $0<y<3$ and $0<z<7$, $Li_{3x}La_{2/3-x}TiO_3$ wherein $0\leq x\leq 1/6$, $Li_{1+y}Al_yTi_{2-y}(PO_4)_3$ wherein $0\leq y\leq 1$, $Li_{1+z}Al_zGe_{2-z}(PO_4)_3$ wherein $0\leq z\leq 1$, LiO, LiF, LiOH, $Li_2CO_3$, $LiAlO_2$, a $LiO-Al_2O_3-SiO_2-P_2O_5-TiO_2-GeO_2$ ceramics, $Li_7La_3Zr_2O_{12}$, $Li_{10}GeP_2S_{12}$, $Li_{3.25}Ge_{0.25}P_{0.75}S_4$, $Li_3PS_4$, $Li_6PS_5Br$, $Li_6PS_5Cl$, $Li_7PS_5$, $Li_6PS_5I$, $Li_{1.3}Al_{0.3}Ti_{1.7}(PO_4)_3$, $LiTi_2(PO_4)_3$, $LiHf_2(PO_4)_3$, $LiZr_2PO_4)_3$, $Li_3(NH_2)_2I$, $LiBH_4$, $LiAlH_4$, $LiNH_2$, $Li_{0.34}La_{0.51}TiO_{2.94}$, $LiSr_2Ti_2NbO_9$, $Li_{0.06}La_{0.66}Ti_{0.93}Al_{0.03}O_3$, $Li_{0.34}Nd_{0.55}TiO_3$, $Li_2CdCl_4$, $Li_2MgCl_4$, $Li_2ZnI_4$, $Li_2CdI_4$, $Li_{4.9}Ga_{0.5+\delta}La_3Zr_{1.7}W_{0.3}O_{12}$ wherein $0\leq\delta\leq 1.6$, $Li_{4.9}Ga_{0.5+\delta}La_3Zr_{1.7}W_{0.3}O_{12}$ wherein $1.7\leq\delta\leq 2.5$, $Li_{5.39}Ga_{0.5+\delta}La_3Zr_{1.7}W_{0.3}O_{12}$ wherein $0\leq\delta\leq 1.11$, or a combination thereof.

13. The solid electrolyte of claim 1, wherein the solid electrolyte comprises a compound that is isostructural with a sodium super-ionic-conductor compound.

14. The solid electrolyte of claim 1, wherein the first electrolyte layer comprises a phosphate having a titanium-containing compound which is isostructural with a sodium super-ionic-conductor compound.

15. The solid electrolyte of claim 1, wherein the first electrolyte layer comprises $Li_{1+x+y}Al_xTi_{2-x}Si_yP_{3-y}O_{12}$ wherein $0<x<2$ and $0\leq y<3$.

16. The solid electrolyte of claim 1, wherein the first electrolyte layer comprises $Li_{1-x+y}Al_xTi_{2-x}Si_yP_{3-y}O_{12}$ wherein $0<x<2$ and $0\leq y<3$, and the second electrolyte layer comprises a compound represented by Formula 4, a compound represented by Formula 5, or a combination thereof

$Li_{1-3x}Hf_2(PO_{4-x}Q_x)_3$   Formula 4 wherein in Formula 4, $0\leq x<1/3$, and Q is F, Cl, Br, I, or a combination thereof,

$Li_{1+4y}Hf_{2-y}(PO_4)_3$   Formula 5 wherein in Formula 5, $0\leq y<2$.

17. The solid electrolyte of claim 1, wherein the solid electrolyte has an ion conductivity retention of about 50 percent to about 90 percent in a lithium hydroxide-saturated solution.

18. The solid electrolyte of claim 1, wherein the solid electrolyte has an ion conductivity at 25° C. of greater than about $1\times10^{-6}$ Siemens per centimeter.

19. A lithium air battery comprising:
a cathode;
an anode; and
an electrolyte disposed between the cathode and the anode, wherein the electrolyte comprises a solid electrolyte comprising
a first electrolyte layer comprising an inorganic lithium ion conductor, and a second electrolyte layer disposed on at least one side of the first electrolyte layer and comprising a compound represented by Formula 1

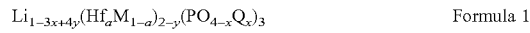

$Li_{1-3x+4y}(Hf_aM_{1-a})_{2-y}(PO_{4-x}Q_x)_3$   Formula 1 wherein, in Formula 1, M is at least one of a monovalent to a hexavalent element, wherein $0<a\leq 1$, $0\leq x<1/3$, and $0\leq y<2$, and Q is F, Cl, Br, I, a pseudohalogen, or a combination thereof.

20. The lithium air battery of claim 19, wherein the first electrolyte layer of the solid electrolyte is in contact with the cathode.

21. The lithium air battery of claim 19, wherein the second electrolyte layer of the solid electrolyte is in contact with the cathode.

22. An electrochemical device comprising the solid electrolyte of claim 1.

23. The electrochemical device of claim 22, wherein the electrochemical device is a battery, an accumulator, a supercapacitor, a fuel cell, a sensor, or an electrochromic device.

24. A lithium air battery comprising:
a cathode;
an anode; and
an electrolyte disposed between the cathode and the anode, wherein the electrolyte comprises the solid electrolyte of claim 6.

25. The lithium air battery of claim 24, wherein the third electrolyte layer is in contact with the cathode.

26. An electrochemical device comprising the solid electrolyte of claim 6.

27. A method of preparing a solid electrolyte, the method comprising:
providing a first electrolyte layer comprising an inorganic lithium ion conductor; and
disposing a second electrolyte layer comprising a compound represented by Formula 1 on at least one side of the first electrolyte layer, to prepare the solid electrolyte

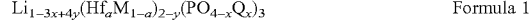

$Li_{1-3x+4y}(Hf_aM_{1-a})_{2-y}(PO_{4-x}Q_x)_3$   Formula 1 wherein, in Formula 1, M is at least one of a monovalent to a hexavalent element, wherein $0<a\leq 1$, $0\leq x<1/3$, and $0\leq y<2$, and Q is F, Cl, Br, I, a pseudohalogen, or a combination thereof.

28. The method of claim 27, wherein the disposing of the second electrolyte layer comprises coating a mixture comprising a vehicle and a compound for forming the compound represented by Formula 1, and heat-treating the mixture to remove the vehicle and form the compound represented by Formula 1.

29. The method of claim 27, wherein the heat-treating comprises heat-treating at a temperature of about 800° C. to about 1,200° C.

30. The method of claim 27, wherein the method further comprises forming a third electrolyte layer,
wherein the first electrolyte layer comprises a first side and an opposite second side, wherein the second electrolyte layer is disposed on the first side of the first electrolyte layer, and
wherein the third electrolyte layer is disposed on the second side of the first electrolyte layer.

\* \* \* \* \*